(12) United States Patent
Hayashi

(10) Patent No.: US 9,742,958 B2
(45) Date of Patent: Aug. 22, 2017

(54) IMAGE PROCESSING SYSTEM AND METHOD FOR TRANSFERRING A PARAMETER BY DIFFERENT TRANSFER MODES

(71) Applicant: Koji Hayashi, Kanagawa (JP)

(72) Inventor: Koji Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/177,472

(22) Filed: Jun. 9, 2016

(65) Prior Publication Data

US 2016/0366304 A1    Dec. 15, 2016

(30) Foreign Application Priority Data

Jun. 15, 2015  (JP) .................................. 2015-120604

(51) Int. Cl.
*H04N 1/60* (2006.01)
*H04N 1/32* (2006.01)

(52) U.S. Cl.
CPC ........... *H04N 1/60* (2013.01); *H04N 1/32101* (2013.01); *H04N 2201/0094* (2013.01)

(58) Field of Classification Search
CPC ........... H04N 1/32101; H04N 1/32128; H04N 1/0097; H04N 2201/0094
USPC ........................................ 358/1.9, 1.16, 1.13
See application file for complete search history.

(56) References Cited

U.S. PATENT DOCUMENTS

| 8,810,869 | B2 | 8/2014 | Gyobu |
| 9,247,093 | B2 | 1/2016 | Katsunoi |
| 2005/0099510 | A1* | 5/2005 | Nakazono .............. H04N 5/772 348/231.3 |
| 2013/0070311 | A1* | 3/2013 | Gyobu ................. H04N 1/2034 358/474 |
| 2015/0077801 | A1* | 3/2015 | Katsunoi ............. H04N 1/0097 358/1.16 |
| 2016/0127613 | A1 | 5/2016 | Katsunoi |

FOREIGN PATENT DOCUMENTS

| JP | 2008-310547 | 12/2008 |
| JP | 2013-066072 | 4/2013 |
| JP | 2015084507 A * | 4/2015 ........... H04N 1/0097 |

* cited by examiner

*Primary Examiner* — Jamares Q Washington
(74) *Attorney, Agent, or Firm* — IPUSA, PLLC

(57) ABSTRACT

An image forming apparatus includes an image processing unit configured to execute image processing that is requested, by using a parameter stored in a second storage unit included in the image processing unit; a control unit configured to store the parameter to be used by the image processing unit in a first storage unit, and generate identification information indicating a storage position of the parameter and store the identification in the first storage unit; and a transfer unit configured to acquire the parameter from the first storage unit based on the identification information stored in the first storage unit, and transfer the parameter to the second storage unit. The control unit stores the parameter in the second storage unit without storing the parameter in the first storage unit, according to the acquired parameter.

13 Claims, 17 Drawing Sheets

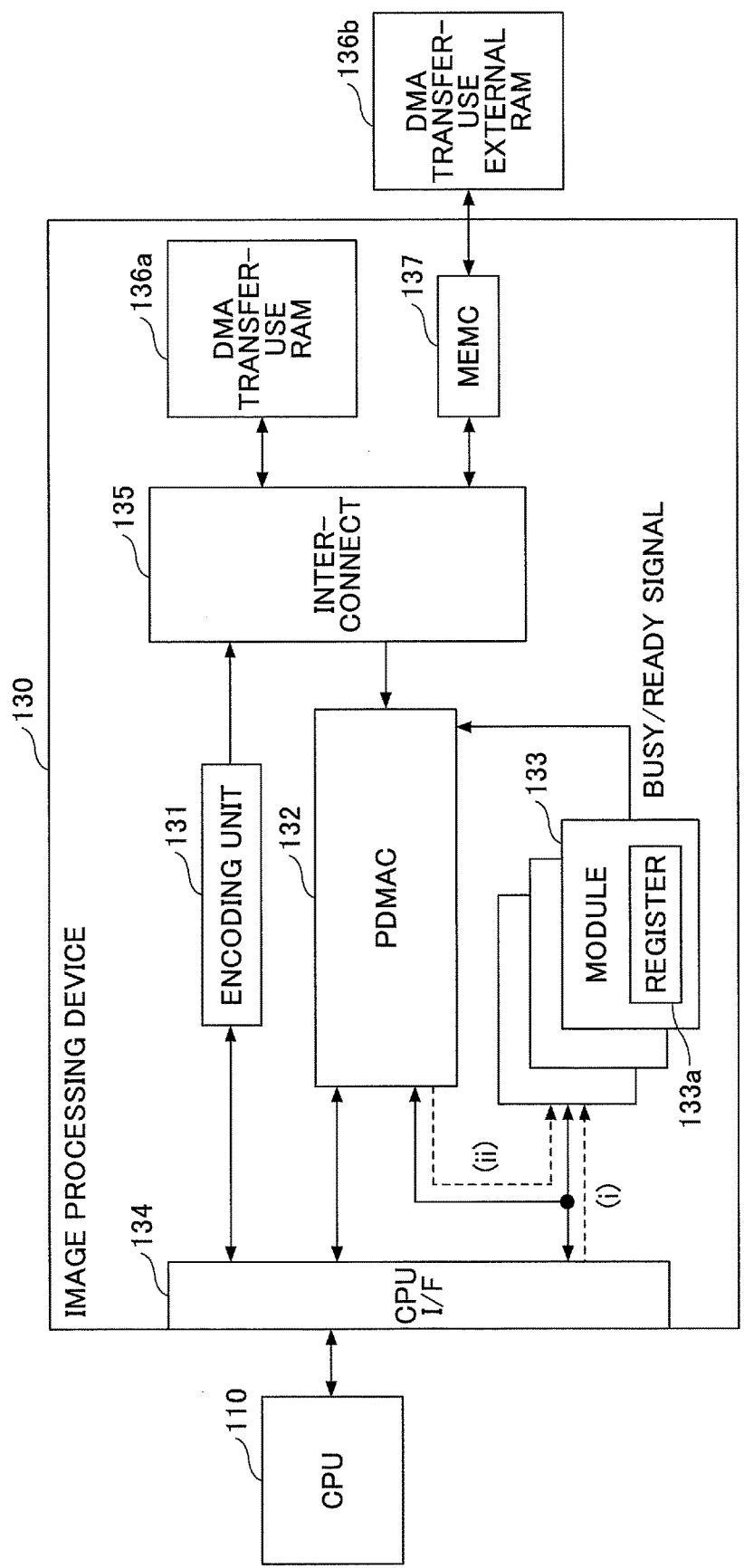

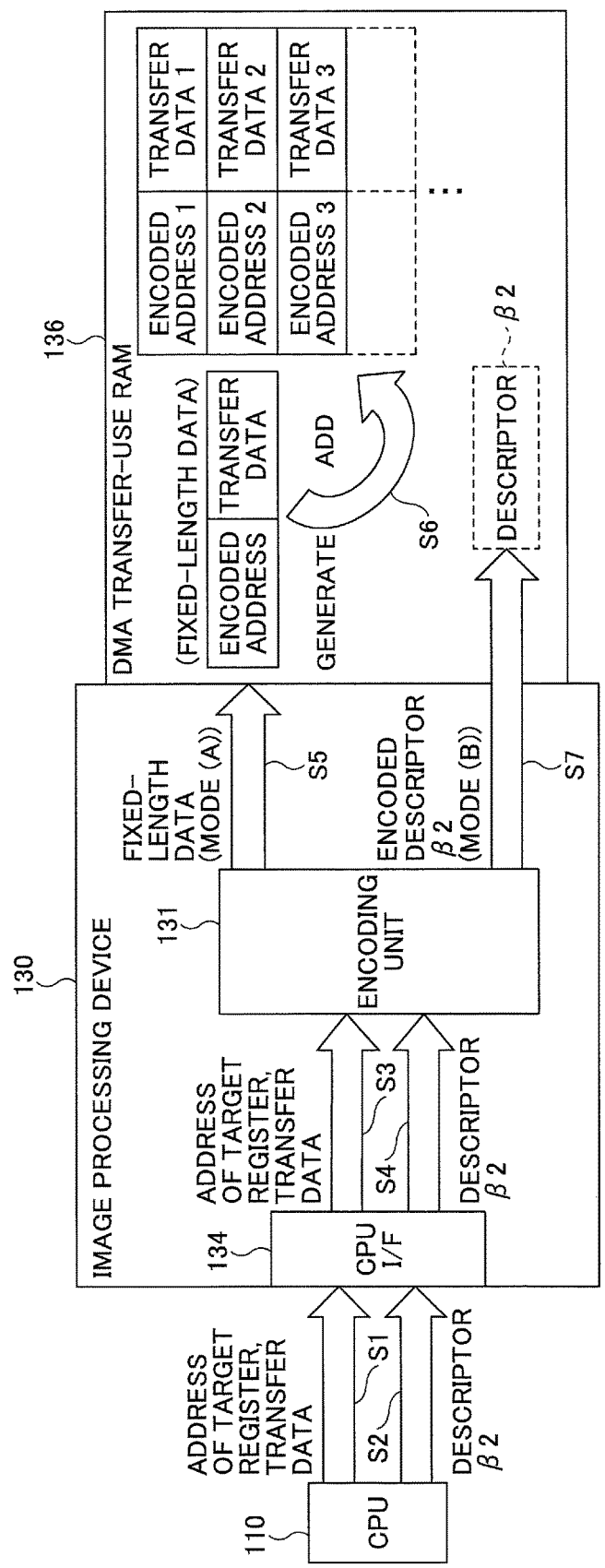

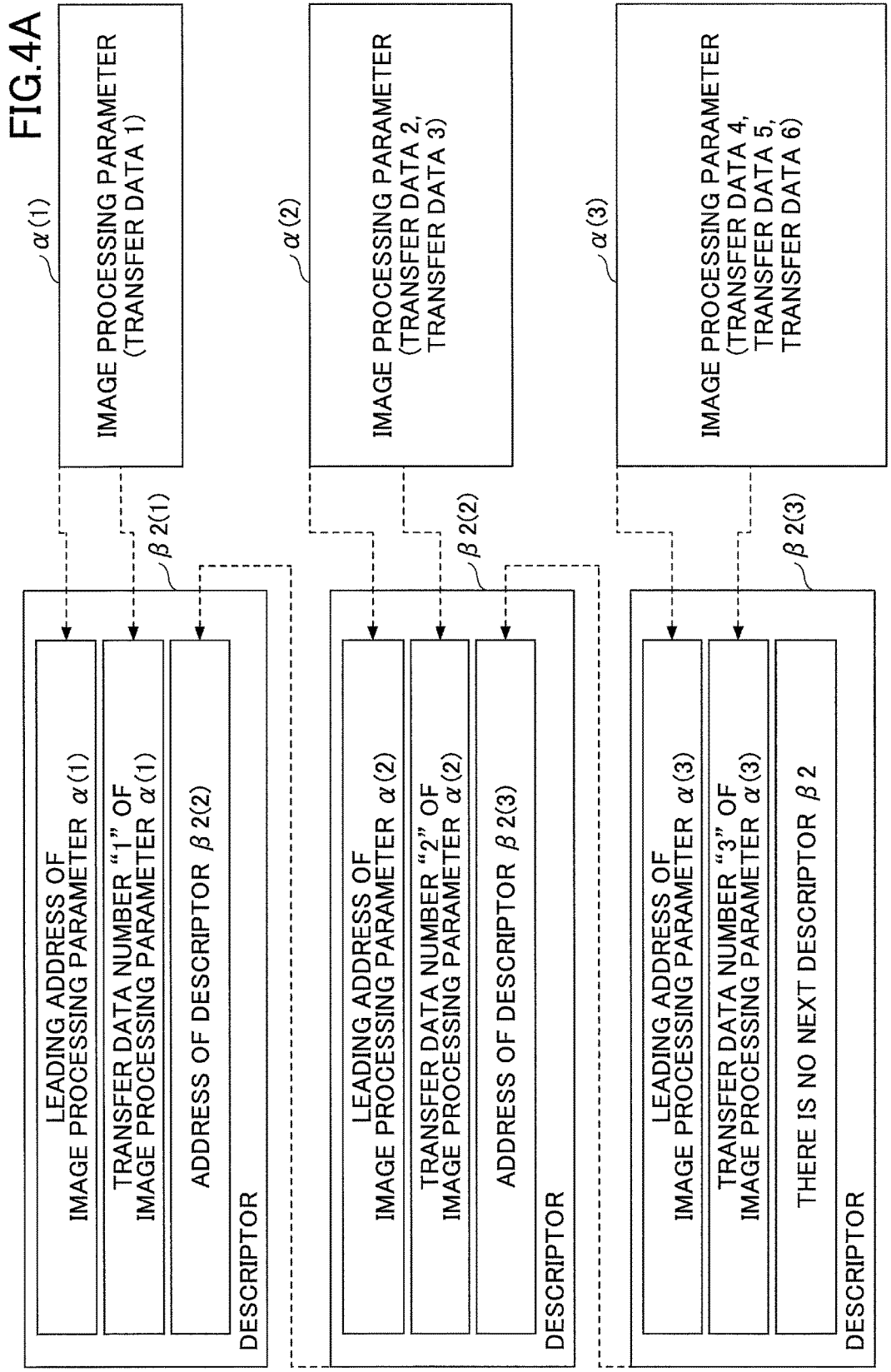

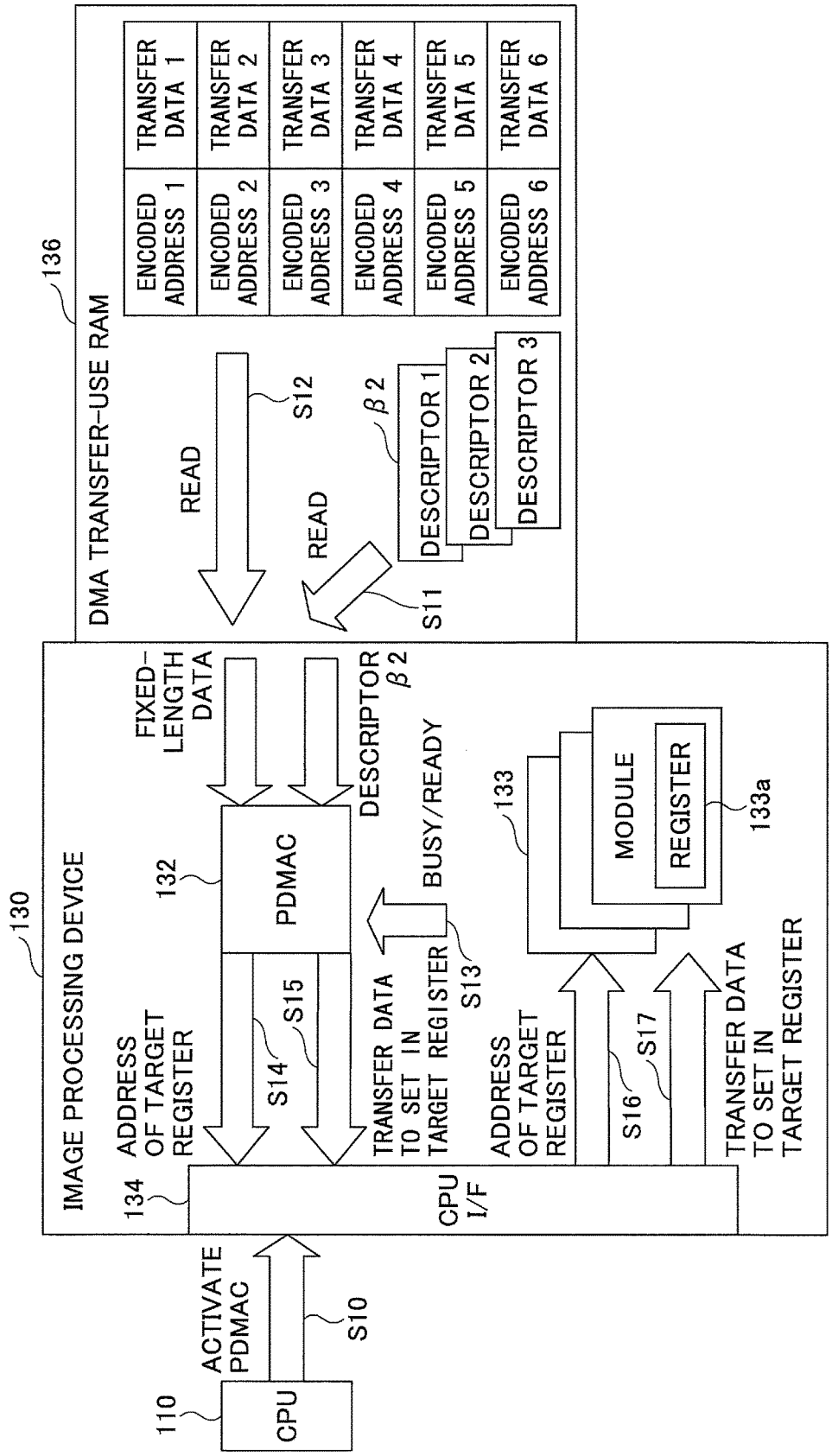

FIG.9

| ITEM | FEATURE OF IMAGE PROCESSING PARAMETER | | METHOD OF SETTING PARAMETER | | | |
|---|---|---|---|---|---|---|
| IMAGE PROCESSING PARAMETER | [FEATURE 1] ARE FIRST SIDE (FRONT SIDE) AND SECOND SIDE (BACK SIDE) DIFFERENT? | [FEATURE 2] PARAMETER TO BE OBTAINED BY CALCULATION? | Case 1 | Case 2 | Case 3 | Case 4 |
| Type-1 | DIFFERENT | NO CALCULATION | USE DMA TRANSFER AND STORE IN REGISTER | USE DMA TRANSFER AND STORE IN REGISTER | USE DMA TRANSFER AND STORE IN REGISTER | USE CPU AND DIRECTLY STORE IN REGISTER |
| Type-2 | DIFFERENT | CALCULATION | DITTO | DITTO | USE CPU AND DIRECTLY STORE IN REGISTER | DITTO |
| Type-3 | SAME | NO CALCULATION | DITTO | USE CPU AND DIRECTLY STORE IN REGISTER | DITTO | DITTO |
| Type-4 | SAME | CALCULATION | DITTO | DITTO | DITTO | DITTO |
| — | — | — | — | — | — | — |

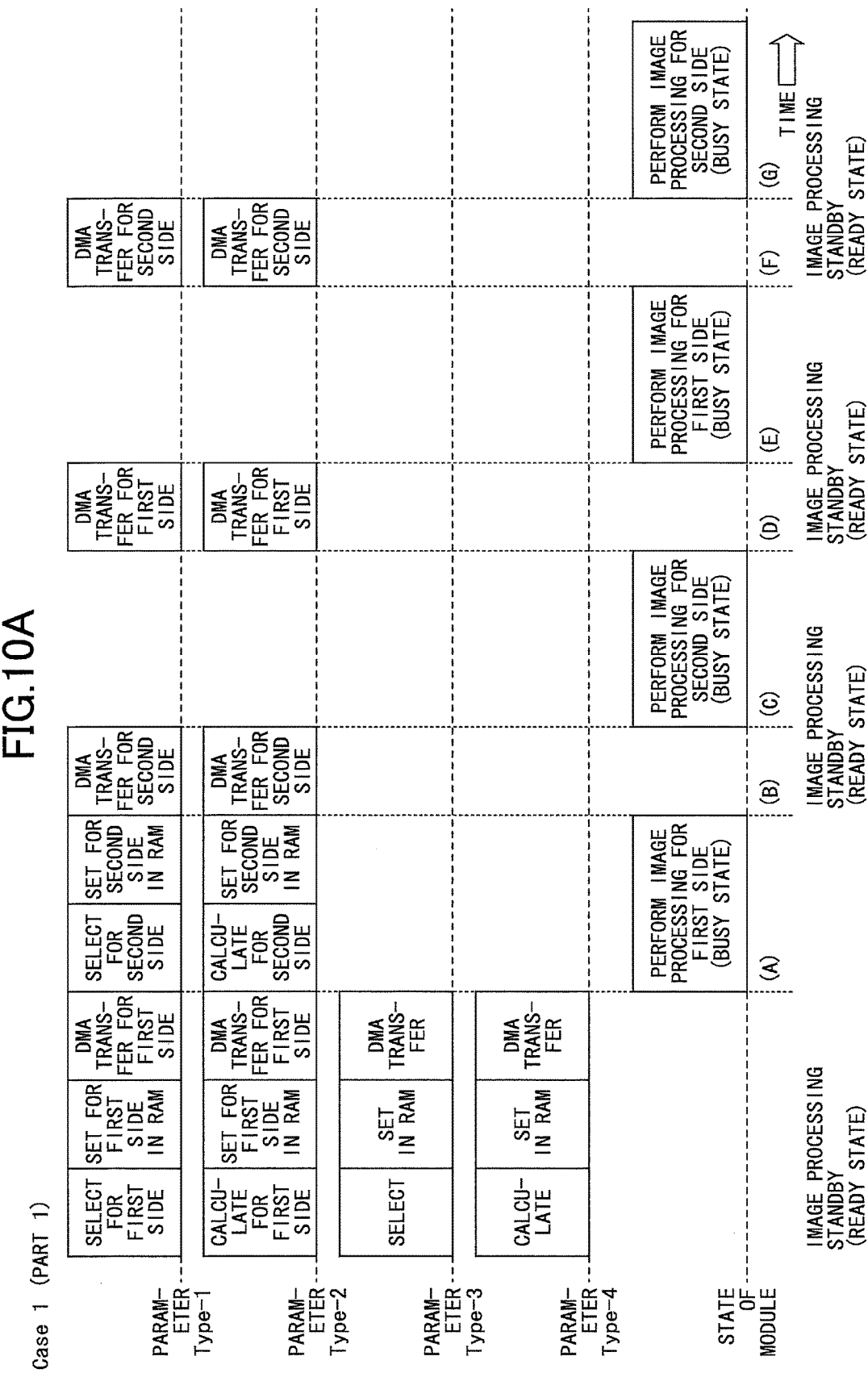

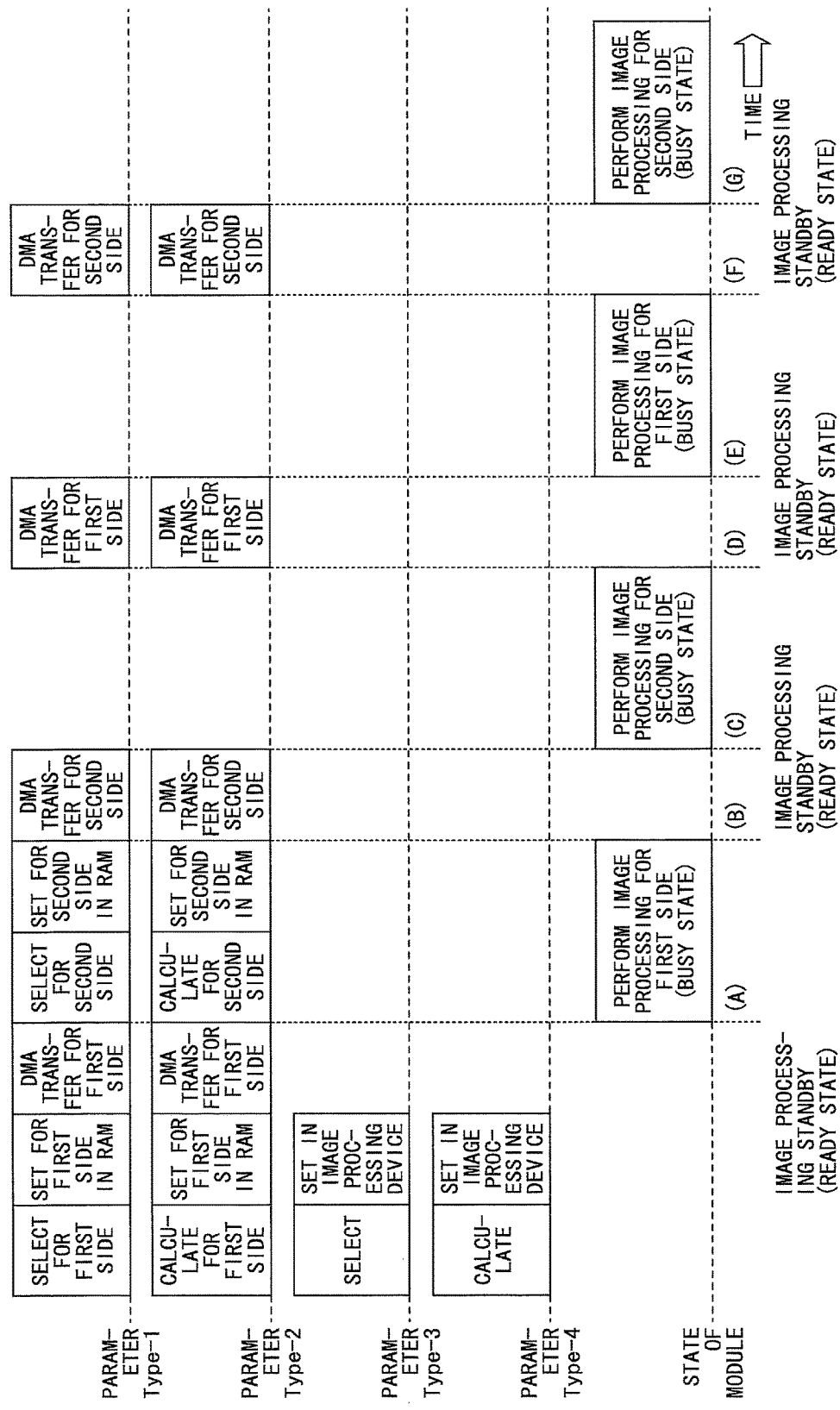

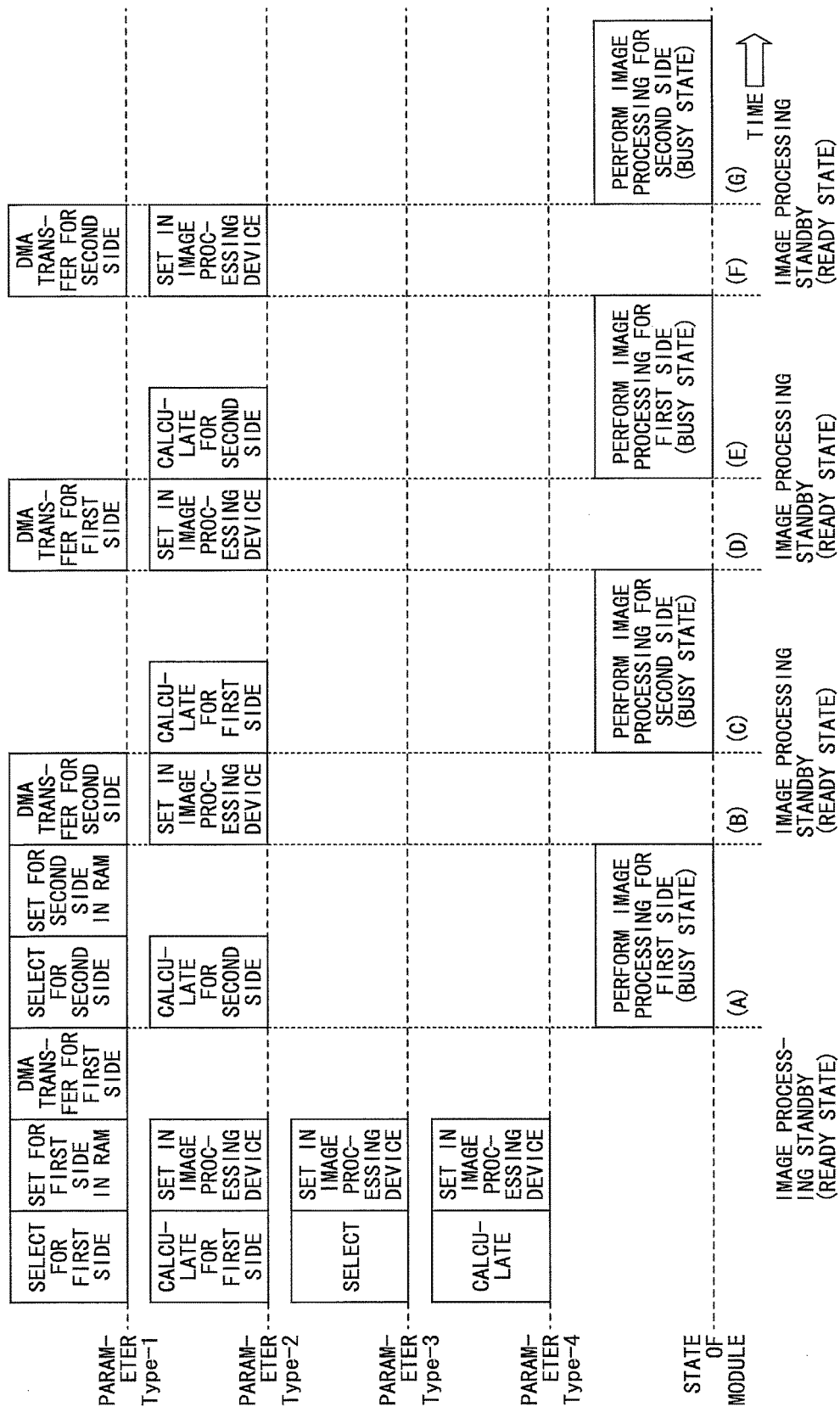

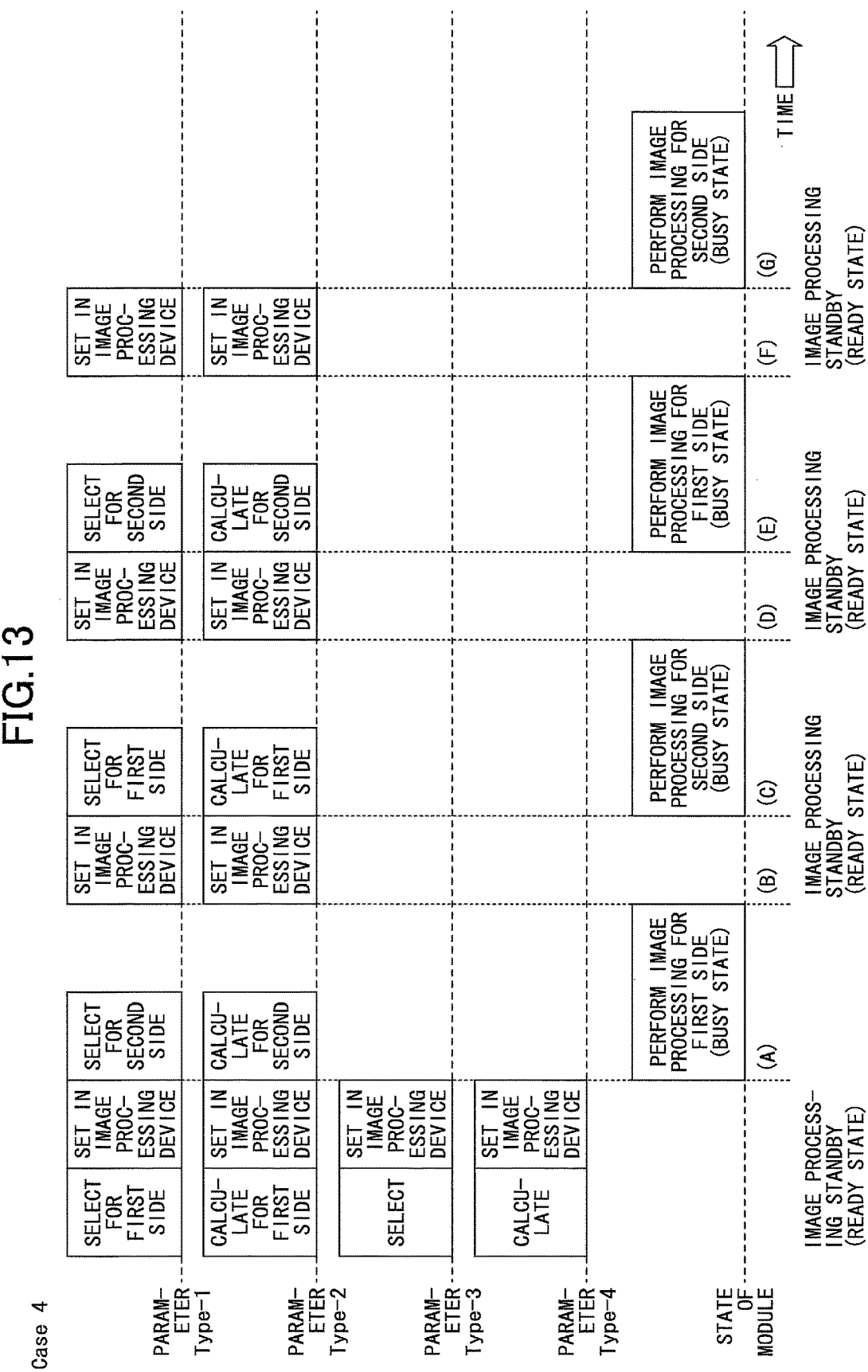

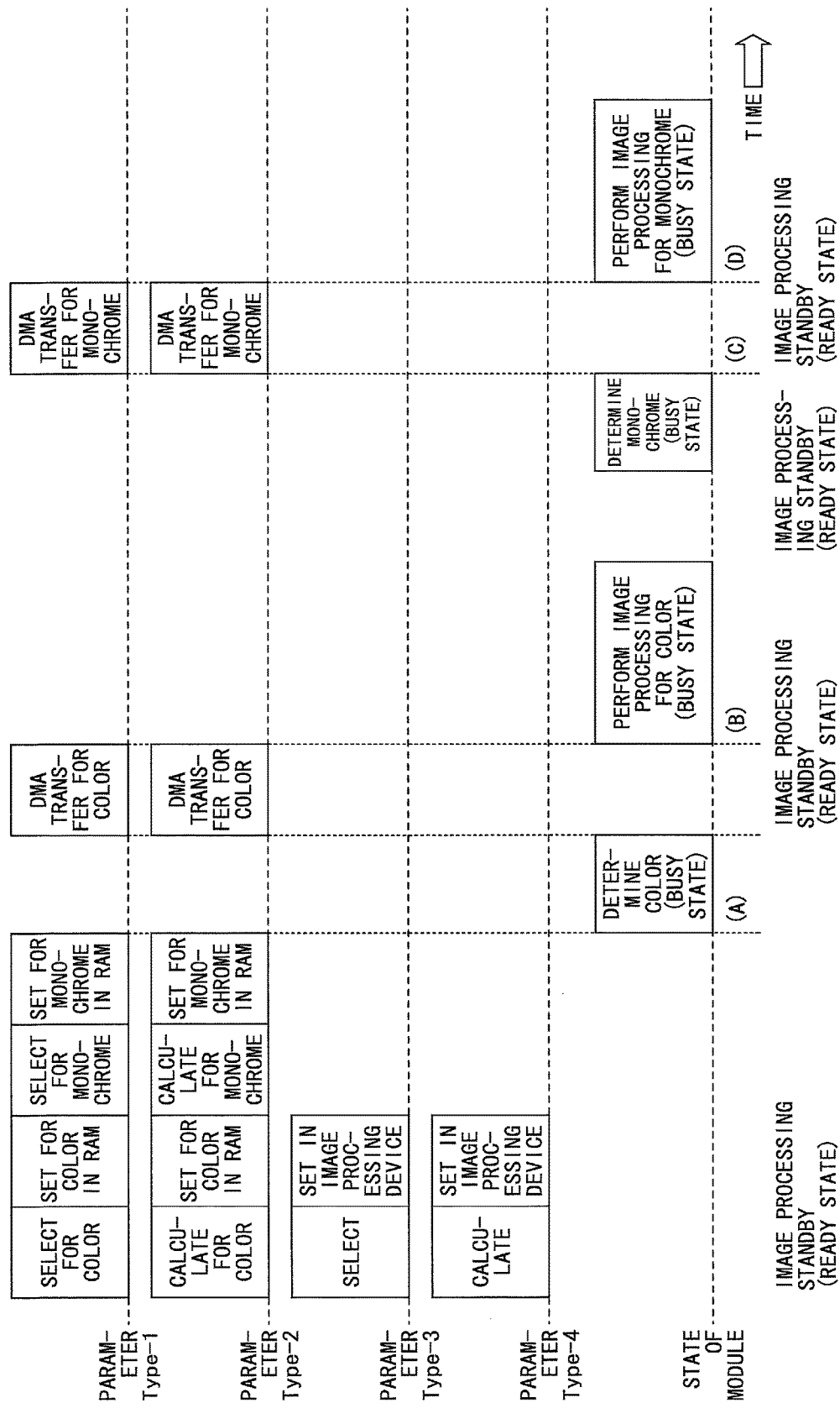

IMAGE PROCESSING SYSTEM AND METHOD FOR TRANSFERRING A PARAMETER BY DIFFERENT TRANSFER MODES

BACKGROUND OF THE INVENTION

1. Field of the Invention

The present invention relates to an image forming apparatus and an image forming method.

2. Description of the Related Art

Image processing devices such ASIC execute image processing based on image processing parameters set in a register included in the device. The setting of the image processing parameters in the register is executed by a CPU, which is the generation source of the parameters. Furthermore, in order to reduce the load of the CPU, there is a method of transferring the image processing parameters stored in a RAM (Random Access Memory) to the register, by DMA transfer.

In the case of DMA transfer, the CPU records a plurality of image processing parameters in a RAM. Furthermore, the CPU generates a descriptor chain, and records the descriptor chain in the RAM. A descriptor chain is an assembly of descriptors indicating addresses of the respective image processing parameters.

At the time of DMA transfer, a plurality of image processing parameters are acquired from the RAM based on the descriptor chain, and the image processing parameters are transferred to the register.

For example, there is disclosed a technology of simultaneously reading the front side and the back side of an original document, and also acquiring image processing parameters for the front side or the back side from a memory, based on the analysis result of whether to perform image processing on the front side or the back side of the original document, and transferring the image processing parameters to a register by DMA transfer (see, for example, Patent Document 1).

However, there have been cases where the processing load of the CPU cannot be appropriately reduced according to image processing.

For example, when transferring the image processing parameters to a register by DMA transfer, overhead occurs in the CPU for generating a descriptor chain, and therefore depending on the type of image processing, the processing load on the CPU becomes higher than the case of directly recording the image processing parameters in the register from the CPU.

Patent Document 1: Japanese Laid-Open Patent Publication No. 2013-066072

SUMMARY OF THE INVENTION

The present invention provides an image forming apparatus and an image forming method, in which one or more of the above-described disadvantages are eliminated.

According to an aspect of the present invention, there is provided an image forming apparatus including an image processing unit configured to execute image processing that is requested, by using a parameter stored in a second storage unit included in the image processing unit; a control unit configured to store the parameter to be used by the image processing unit in a first storage unit, and generate identification information indicating a storage position of the parameter and store the identification in the first storage unit; and a transfer unit configured to acquire the parameter from the first storage unit based on the identification information stored in the first storage unit, and transfer the parameter to the second storage unit, wherein the control unit stores the parameter in the second storage unit without storing the parameter in the first storage unit, according to the acquired parameter.

According to an aspect of the present invention, there is provided an image forming method executed by an image forming apparatus including an image processing unit configured to execute image processing that is requested, by using a parameter stored in a second storage unit, the image forming method including acquiring the parameter and storing the parameter in a first storage unit, and generating identification information indicating a storage position of the parameter and storing the identification information in the first storage unit; and acquiring the parameter from the first storage unit based on the identification information stored in the first storage unit, and transferring the parameter to the second storage unit, wherein the parameter is stored in the second storage unit without being stored in the first storage unit, when the acquired parameter is a predetermined parameter.

BRIEF DESCRIPTION OF THE DRAWINGS

Other objects, features and advantages of the present invention will become more apparent from the following detailed description when read in conjunction with the accompanying drawings, in which:

FIG. 2 illustrates an example of a configuration of an image processing device;

FIG. 3 illustrates operations of the image processing device in the case of using DMA transfer;

FIG. 4A illustrates an example of a data structure of a descriptor β2;

FIG. 5 illustrates an operation of the image processing device when a PDMAC is activated;

FIG. 9 illustrates a specific example of a method of setting an image processing parameter α;

FIGS. 10A and 10B are for describing the method of setting image processing parameters of Case 1;

FIGS. 11A and 11B are for describing the method of setting image processing parameters of Case 2;

FIG. 12 is for describing the method of setting image processing parameters of Case 3;

FIG. 13 is for describing the method of setting image processing parameters of Case 4; and FIG. 14 is for describing the method of setting image processing parameters in a case of performing color determination of an original document.

DETAILED DESCRIPTION OF THE PREFERRED EMBODIMENTS

Embodiments of the present invention will be described with reference to the accompanying drawings. Note that in the specification and the drawings, elements having substan-

First Embodiment (Overall Configuration of Image Processing System)

Figure 1:
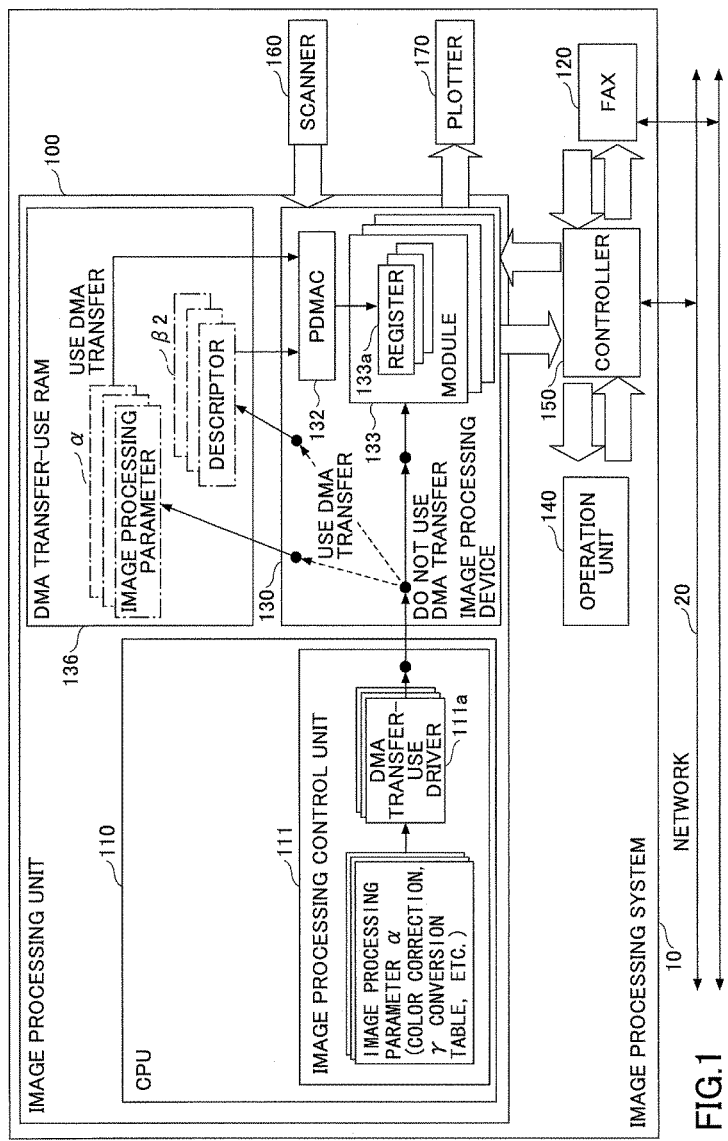
FIG. 1 illustrates an example of a configuration of an image processing system.

FIG. 1 illustrates an example of a configuration of an image processing system 10. A description is given of a process in the image processing system 10 with reference to FIG. 1.

The image processing system 10 is, for example, an image forming apparatus such as a multifunction peripheral. The image processing system 10 includes an image processing unit 100, a fax 120, an operation unit 140, a controller 150, a scanner 160, and a plotter 170. The image processing unit 100 includes a CPU 110, an image processing device 130, and a DMA transfer-use RAM (Random Access Memory) 136. The image processing device 130 is, for example, an ASIC, and includes a PDMAC (Parameter Direct Memory Access Controller) 132 and one or more modules 133.

The image processing unit 100 performs image processing specified at the operation unit 140, on image data received from outside via the fax 120, the scanner 160, or a network 20. The operation unit 140 is, for example, a touch panel, and accepts a specification of image processing from the user, such as color printing, monochrome printing, scanning, etc. The scanner 160 sends image data obtained by scanning an image, to the image processing device 130. The fax 120 sends image data received via the network 20, to the controller 150. The controller 150 sends image data received from outside via the fax 120 or the network 20, to the image processing device 130. Furthermore, the controller 150 implements control for causing the image processing unit 100 to execute the image processing specified at the operation unit 140.

The CPU 110 functions as an image processing control unit 111 by a process that the CPU 110 is caused to execute by a program installed in the image processing system 10. The image processing control unit 111 selects an image processing parameter $\alpha$ such as a color correction parameter and a $\gamma$ conversion table, in response to a request for image processing.

Specifically, one or more image processing parameters $\alpha$ that are used for image processing are managed in, for example, a table. That is, there is a table for managing one or more image processing parameters $\alpha$ used for image processing, for each image processing operation. The image processing control unit 111 selects a table in response to a request for image processing, and acquires one or more image processing parameters $\alpha$.

Furthermore, the image processing control unit 111 may calculate the image processing parameter $\alpha$ every time image processing is performed. For example, when the image processing parameter $\alpha$ changes with time, the image processing control unit 111 calculates the image processing parameter $\alpha$ by using the elapsed time every time image processing is performed.

Furthermore, the image processing control unit 111 selects between using DMA transfer to set the image processing parameter $\alpha$ in a register 133a, or not using DMA transfer and setting the image processing parameter $\alpha$ in the register 133a by itself.

When using DMA transfer, the image processing control unit 111 uses a DMA transfer-use driver 111a to store the image processing parameter $\alpha$ (transfer data) in the DMA transfer-use RAM 136. Furthermore, the image processing control unit 111 generates a descriptor $\beta$2 in the DMA transfer-use RAM 136. The descriptor $\beta$2 includes information such as address information in the DMA transfer-use RAM 136 of the image processing parameter $\alpha$ generated in the image processing parameter $\alpha$, the transfer data number (number of transfer data items), etc., of the image processing parameter $\alpha$ that has been generated at the image processing device 130. Next, the image processing control unit 111 activates the PDMAC 132. The PDMAC 132 reads the image processing parameter $\alpha$ based on the information of the descriptor $\beta$2, and sets the image processing parameter $\alpha$ in the register 133a. As a result, DMA transfer is realized. Note that transfer data is data corresponding to part of or the entirety of the image processing parameter $\alpha$.

On the other hand, when DMA transfer is not used, the image processing control unit 111 uses the DMA transfer-use driver 111a to set the image processing parameter $\alpha$ in the register 133a in the module 133, by itself.

The plotter 170 outputs the image data processed at the image processing unit 100, to a medium in a predetermined output format. For example, the plotter 170 outputs image data generated at the image processing unit 100, on a print sheet by a resolution of the output side.

FIG. 2 illustrates an example of a configuration of the image processing device 130. The image processing device 130 includes, in addition to the PDMAC 132 and the module 133, an encoding unit 131, a CPU I/F (Interface) 134, an interconnect 135, a DMA transfer-use RAM 136a, and a MEMO (Memory Controller) 137. Furthermore, the image processing device 130 is connected to the CPU 110 and a DMA transfer-use external RAM 136b. Each module 133 includes a register 133a. The interconnect 135 connects the encoding unit 131, the DMA transfer-use RAM 136a, and the DMA transfer-use external RAM 136b. Furthermore, the interconnect 135 connects the PDMAC 132, the DMA transfer-use RAM 136a, and the DMA transfer-use external RAM 136b. Note that the DMA transfer-use RAM 136a and the DMA transfer-use external RAM 136b correspond to the DMA transfer-use RAM 136 in FIG. 1. In the following, when the DMA transfer-use RAM 136a and the DMA transfer-use external RAM 136b are not distinguished from each other, these are referred to as the DMA transfer-use RAM 136.

The CPU I/F 134 is a communication interface between the CPU 110 and the image processing device 130. When the image processing control unit 111 does not use DMA transfer, the CPU I/F 134 directly sets the image processing parameter $\alpha$ in the register 133a corresponding to the address specified by the CPU 110 (route (i)).

Note that the CPU I/F 134 may read the image processing parameter $\alpha$ from the register 133a corresponding to the address specified by the CPU 110. For example, when the CPU 110 determines whether the scanned original document is color or monochrome, the CPU I/F 134 reads the image processing parameter $\alpha$ from a predetermined register 133a, and sends the image processing parameter $\alpha$ to the CPU 110.

When the image processing control unit 111 uses DMA transfer, the encoding unit 131 encodes the address of the register 133a specified by the CPU 110 and the transfer data, and sets this information in the DMA transfer-use RAM 136. The transfer data is data constituting the image processing parameter $\alpha$. Furthermore, when the image processing parameter $\alpha$ has a large size as in the case of a $\gamma$ conversion table, a plurality of transfer data items constitute a single image processing parameter $\alpha$. Furthermore, encoding means to compress the address of the register 133a and the transfer data. For example, with respect to transfer data stored in an address having an address number of greater than or equal to 10000 and less than 20000, the encoding unit 131 encodes the address of the register 133a by omitting "1" in the fifth digit such that the address becomes four digits.

Furthermore, the encoding unit 131 encodes the address of the register 133a and the transfer data, such that the data becomes fixed-length data. For example, when the address of the register 133a is 19 bits and the transfer data is 18 bits, the encoding unit 131 encodes the address of the register 133a into 16 bits, and encodes the transfer data into 16 bits. The encoding unit 131 performs the encoding such that the encoded address of the register 133a and the encoded transfer data become fixed-length data having a total of two bytes (32 bits). Note that in the following, the data that is a combination of the address of the register 133a and the transfer data is also referred to as fixed-length data.

Furthermore, the encoding unit 131 encodes the descriptor β2 sent from the CPU 110, and stores the encoded descriptor β2 in the DMA transfer-use RAM 136.

Each module 133 is a circuit, such as a color correction circuit, a gradation circuit, a γ conversion circuit, etc., and performs image processing on the image data based on the image processing parameter α. The module 133 sends a BUSY signal to the PDMAC 132 during the image processing operation. Furthermore, when the image processing is ended, the module 133 sends a READY signal to the PDMAC 132.

The PDMAC 132 reads the encoded address of the register 133a and the encoded transfer data from the DMA transfer-use RAM 136 via the interconnect 135 based on the descriptor β2, and decodes the address of the register 133a and the transfer data. Next, the PDMAC 132 generates the image processing parameter α from the transfer data when a READY signal is received from the module 133, and sets the image processing parameter α in the register 133a corresponding to the decoded address (route (ii)).

FIG. 3 illustrates operations of the image processing device 130 in the case of using DMA transfer. With reference to FIG. 3, a description is given of a process of setting the transfer data in the DMA transfer-use RAM 136, in the case of using DMA transfer.

The CPU 110 sends the address of the register 133a in which the image processing parameter α is to be set, the transfer data, and the descriptor β2, to the CPU I/F 134 (steps S1, S2). The CPU I/F 134 sends the address of the register 133a in which the image processing parameter α is to be set, the transfer data, and the descriptor β2, to the encoding unit 131 (steps S3, S4).

The encoding unit 131 executes two modes, that is, a mode (A) of storing the transfer data, and a mode (B) of storing the descriptor β2. The encoding unit 131 switches between the two modes (A) and (B) to distinguish between a case where the data that is the processing target is transfer data, and a case where the data that is the processing target is a descriptor β2. In the following, a description is given of the processes executed in the respective modes.

First, the encoding unit 131 shifts to the mode (A) of storing the transfer data. The encoding unit 131 encodes the address of the register 133a and the transfer data sent from the CPU 110 (step S5). That is, the encoding unit 131 encodes the address of the register 133a and the transfer data, such that the data becomes fixed-length data of two bytes.

The encoding unit 131 stores the fixed-length data in the address in the DMA transfer-use RAM 136 specified by the CPU 110 (step S6).

When a plurality of transfer data items are continuously stored in the DMA transfer-use RAM 136, the encoding unit 131 sequentially increments the storage address in the DMA transfer-use RAM 136, such that the data becomes continuous.

For example, when the address of the register 133a is 18 bits and the transfer data is 16 bits, the encoding unit 131 encodes the address of the register 133a into 16 bits, such that the address of the register 133a and the transfer data becomes fixed-length data having a total of two bytes (32 bits). The encoding unit 131 increments the storage address in the DMA transfer-use RAM 136 by 32 bits, every time fixed-length data is stored. Accordingly, the encoding unit 131 stores the next fixed-length data at the end of the fixed-length data stored in the register 133a.

Next, the encoding unit 131 shifts to the mode (B) of storing the descriptor β2.

The encoding unit 131 receives a descriptor β2 transferred from the CPU 110 (steps S2, S4). The encoding unit 131 encodes the descriptor β2, and stores the encoded descriptor β2 in the DMA transfer-use RAM 136 (step S7).

FIG. 4A illustrates an example of a data structure of the descriptor β2. As illustrated in FIG. 4A, the descriptors β2 (1), β2 (2), β2 (3) are descriptors β2 that respectively correspond to image processing parameters α (1), α (2), α (3). Furthermore, the descriptors β2 (1), β2 (2), β2 (3) have roles of associating the three image processing parameters α (1), α (2), α (3) with each other.

For example, the descriptor β2 (1) includes the leading address of the image processing parameter α (1) in the DMA transfer-use RAM 136, the transfer data number (transfer data number) "1" of the image processing parameter α (1), and the address of the descriptor β2 (2) in the DMA transfer-use RAM 136.

Furthermore, the descriptor β2 (2) includes the leading address of the image processing parameter α (2) in the DMA transfer-use RAM 136, the transfer data number "2" of the image processing parameter α (2), and the address of the descriptor β2 (3) in the DMA transfer-use RAM 136.

Furthermore, the descriptor β2 (3) includes the leading address of the image processing parameter α (3) in the DMA transfer-use RAM 136, the transfer data number "3" of the image processing parameter α (3), and information indicating that there are no more descriptors. For example, as the information indicating that there are no more descriptors, a particular value such as "0" is stored.

Figure 4B:
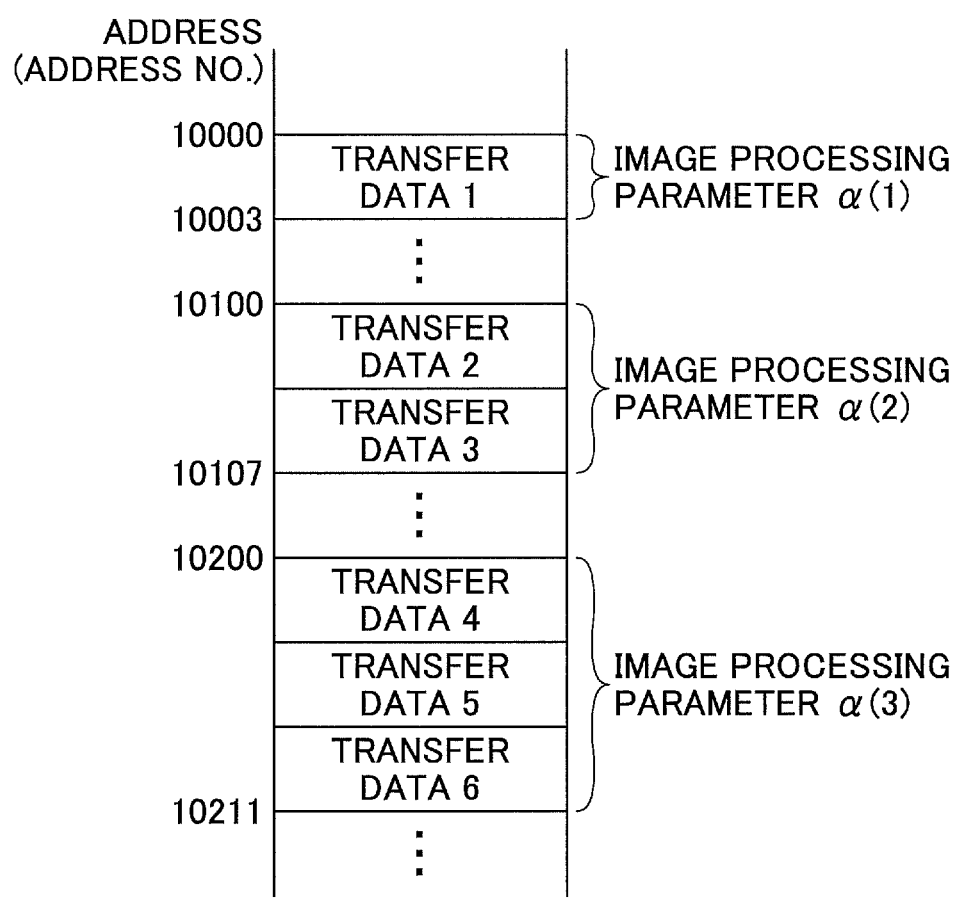
FIG. 4B illustrates the relationship between transfer data and the image processing parameter α in a DMA transfer-use RAM.

FIG. 4B illustrates the relationship between the transfer data and the image processing parameter α in the DMA transfer-use RAM 136. That is, FIG. 4B illustrates the address (address number) in the DMA transfer-use RAM 136 where each transfer data item is stored. Each transfer data item is fixed-length data of 32 bits. Note that data of eight bits is stored in one address.

When the leading address of the image processing parameter α (1) in the DMA transfer-use RAM 136 is "10000", the transfer data number is "1", and therefore the end address is "10003", and "transfer data 1" is stored. Note that the image processing parameter α (1) includes "transfer data 1".

When the leading address of the image processing parameter α (2) in the DMA transfer-use RAM 136 is "10100", the transfer data number is "2", and therefore the end address is "10107", and "transfer data 2" and "transfer data 3" are stored. Note that the image processing parameter α (2) includes "transfer data 2" and "transfer data 3".

When the leading address of the image processing parameter α (3) in the DMA transfer-use RAM 136 is "10200", the transfer data number is "3", and therefore the end address is "10211", and "transfer data 4", "transfer data 5", and "transfer data 5" are stored. Note that the image processing parameter α (3) includes "transfer data 4", "transfer data 5", and "transfer data 5".

FIG. 5 illustrates the operation of the image processing device 130, when the PDMAC 132 is activated. With reference to FIG. 5, a description is given of a process in which the PDMAC 132 acquires the transfer data from the DMA transfer-use RAM 136, and sets the transfer data in the register 133a, when using DMA transfer. That is, the image processing device 130 performs the process of FIG. 5 after performing the process of FIG. 3.

The PDMAC 132 receives the specification of a path of image processing and the address of the descriptor β2 to be read first in the DMA transfer-use RAM 136, and is activated by the CPU 110 (step S10).

A path of image processing is information indicating the module used for image processing. For example, when reading an original document and printing an image of the original document on a print sheet in the image processing system 10, the CPU 110 uses a path of image processing for reading an original document (scanning), and a path of image processing for printing. For example, in a path of image processing for reading an original document, a module for executing γ1 (pre-process), a module for executing color correction, and a module for executing γ2 (post-process) are specified. Furthermore, in a path of image processing for printing, a module for executing γ3 and a module for executing gradation correction are specified. Note that in the case of color printing, the CPU 110 specifies an image processing path and activates a PDMAC 132 for each of the four colors of yellow, magenta, cyan, and black, and a special color.

Figure 7:
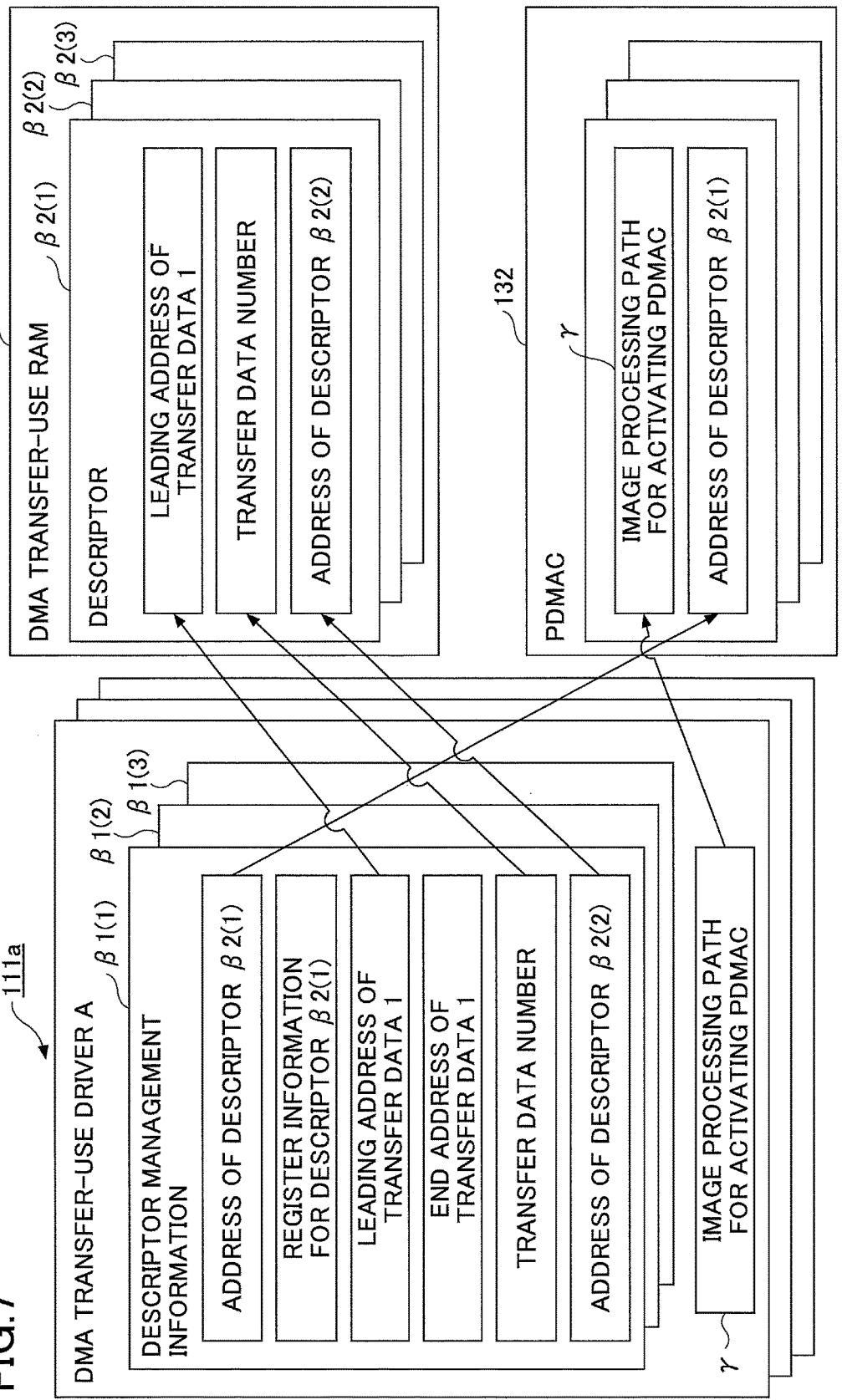
FIG. 7 is for describing a DMA transfer-use driver.

Note that as illustrated in FIG. 7 described below, the DMA transfer-use driver 111a includes descriptor management information β1 relevant to the descriptor β2. The CPU 110 specifies the address of the descriptor β2 in the DMA transfer-use RAM 136 included in the descriptor management information β1, and activates the PDMAC 132. The descriptor management information β1 is described below.

The PDMAC 132 reads an encoded descriptor β2 from the address in the DMA transfer-use RAM 136 specified by the CPU 110 (step S11). Next, the PDMAC 132 decodes the encoded descriptor β2. Next, the PDMAC 132 reads the fixed-length data from the DMA transfer-use RAM 136, based on the decoded descriptor β2 (step S12).

The PDMAC 132 decodes the fixed-length data read from the DMA transfer-use RAM 136, and acquires the address of the register 133a and the transfer data. Next, when a READY signal is received from the module 133 (step S13), the PDMAC 132 sets the transfer data in the register 133a of the module 133, based on the decoded address of the register 133a (steps S14 through S17). Note that when a BUSY signal is received from the module 133 (step S13), the PDMAC 132 waits until a READY signal is received.

Next, a description is given of a case where a plurality of transfer data items constituting a single image processing parameter α, are set in the register 133a. For example, when a single image processing parameter α is constituted by transfer data 1, transfer data 2, and transfer data 3, the PDMAC 132 acquires "address 1, transfer data 1", "address 2, transfer data 2", and "address 3, transfer data 3", when the fixed-length data is decoded. The PDMAC 132 sets the transfer data 1 at a predetermined address in the register 133a, based on the address 1. Next, the PDMAC 132 sets the transfer data 2 at the end address of the transfer data 1 in the register 133a, based on the address 2. Next, the PDMAC 132 sets the transfer data 3 at the end address of the transfer data 2 in the register 133a, based on the address 3. In this manner, the PDMAC 132 sets the image processing parameter α in the register 133a.

(Procedures of Setting Image Processing Parameter)

Figure 6:
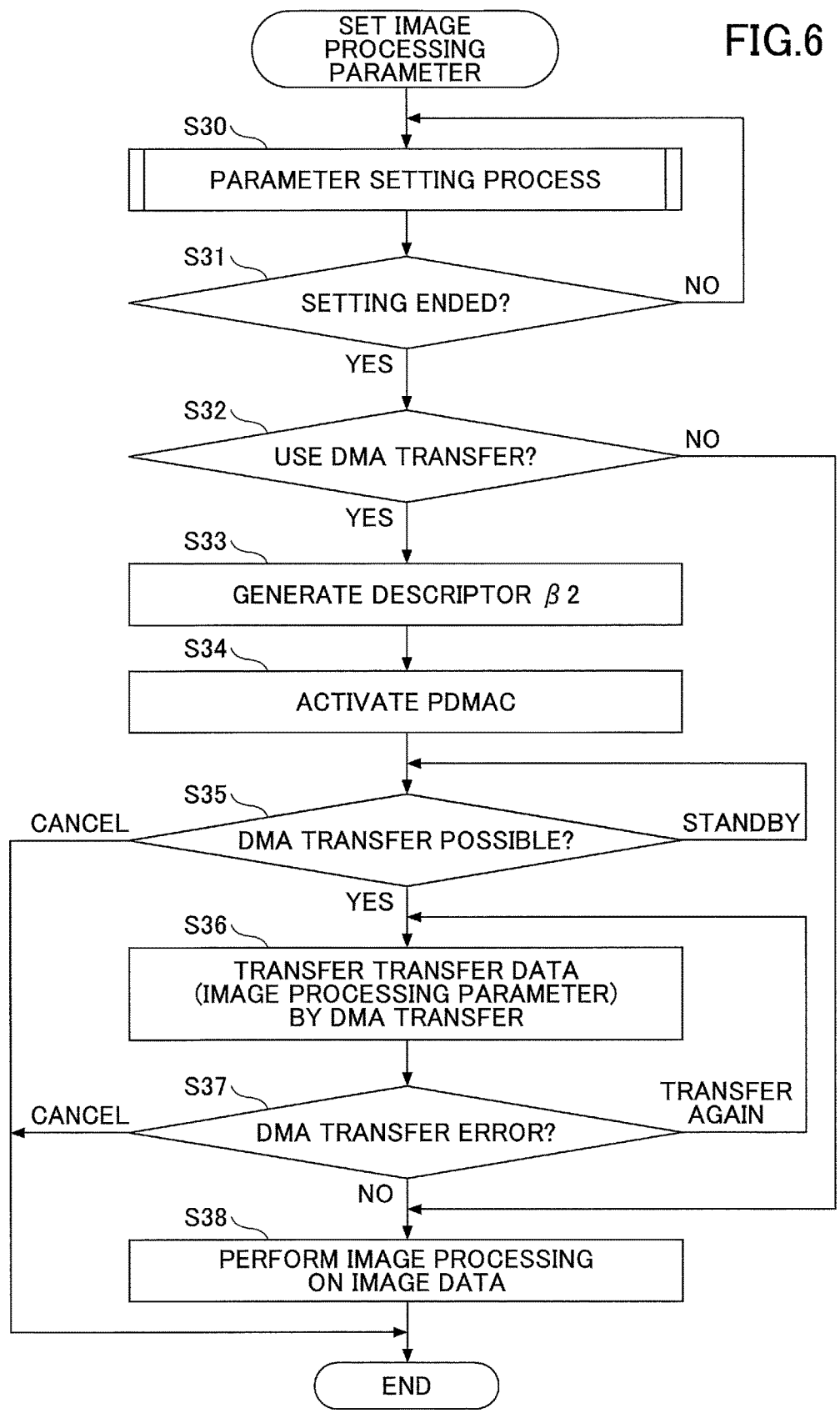
FIG. 6 is a flowchart of procedures of setting an image processing parameter α.

FIG. 6 is a flowchart of procedures of setting an image processing parameter α. The image processing control unit 111 performs a parameter setting process (step S30). In the parameter setting process, when DMA transfer is to be used, the image processing control unit 111 stores the image processing parameter α in the DMA transfer-use RAM 136; and when DMA transfer is not used, the image processing control unit 111 sets the image processing parameter α in the register 133a by the image processing control unit 111 itself. Note that the parameter setting process of step S30 is described in detail with reference to FIG. 8.

The image processing control unit 111 determines whether setting of all image processing parameters α has ended (step S31). When there is an image processing parameter α that is not set (NO in step S31), the image processing control unit 111 repeats step S30. On the other hand, when setting of all image processing parameters α has ended (YES in step S31), the image processing control unit 111 shifts to the process of step S32. Note that when a table having a plurality of parameters is processed, such as a γ table of 256 gradations, a 3D-LUT (Look Up Table) of the cube of nine parameters (729 parameters) or the cube of 17 parameters (4913 parameters), etc., the image processing control unit 111 determines whether the setting of image processing parameters α has ended by assuming that the whole table is a single parameter.

In step S32, the image processing control unit 111 determines whether DMA transfer is to be used with respect to the image processing parameter α, based on the determination result of step S10. When DMA transfer is not to be used (NO in step S32), the image processing control unit 111 shifts to the process of step S38. On the other hand, when DMA transfer is to be used (YES in step S32), the image processing control unit 111 shifts to the process of step S33.

Note that in step S32, for example, the image processing control unit 111 may determine whether to use DMA transfer, based on whether the number of copies to be printed is greater than or equal to a predetermined number.

In step S33, the image processing control unit 111 generates a descriptor β2 including the address of the DMA transfer-use RAM 136 storing the transfer data and the transfer data number, and stores the descriptor β2 in the DMA transfer-use RAM 136. Note that when there are a plurality of image processing parameters α, the image processing control unit 111 may set the descriptor β2 as a descriptor chain. Furthermore, when a descriptor β2 corresponding to the image processing parameter α is already included in the DMA transfer-use RAM 136, the image processing control unit 111 does not have to generate a descriptor β2 again.

Next, the image processing control unit 111 sets the leading address of the descriptor β2 in the DMA transfer-use RAM 136, in the register included in the PDMAC 132, and specifies the path of image processing of the PDMAC 132 and activates the PDMAC 132 (step S34).

Next, the PDMAC 132 determines whether DMA transfer is possible (step S35). When the module 133 of the transfer destination is not performing image processing (READY state) and DMA transfer is possible (YES in step S35), the PDMAC 132 transfers the transfer data (image processing parameter α) to the module 133 of the transfer destination by DMA transfer (step S36).

On the other hand, when the module 133 of the transfer destination is performing image processing (BUSY state) and DMA transfer is not possible, the PDMAC 132 stands by until the image processing ends (standby in step S35), or cancels the image processing at the module 133 of the transfer destination (cancel in step S35).

Next, the PDMAC 132 determines whether a DMA transfer error has occurred when performing DMA transfer in step S36 (step S37). When a DMA transfer error has occurred, the PDMAC 132 performs DMA transfer again (transfer again in step S37), or cancels the DMA transfer (cancel in step S37).

Figure 8:
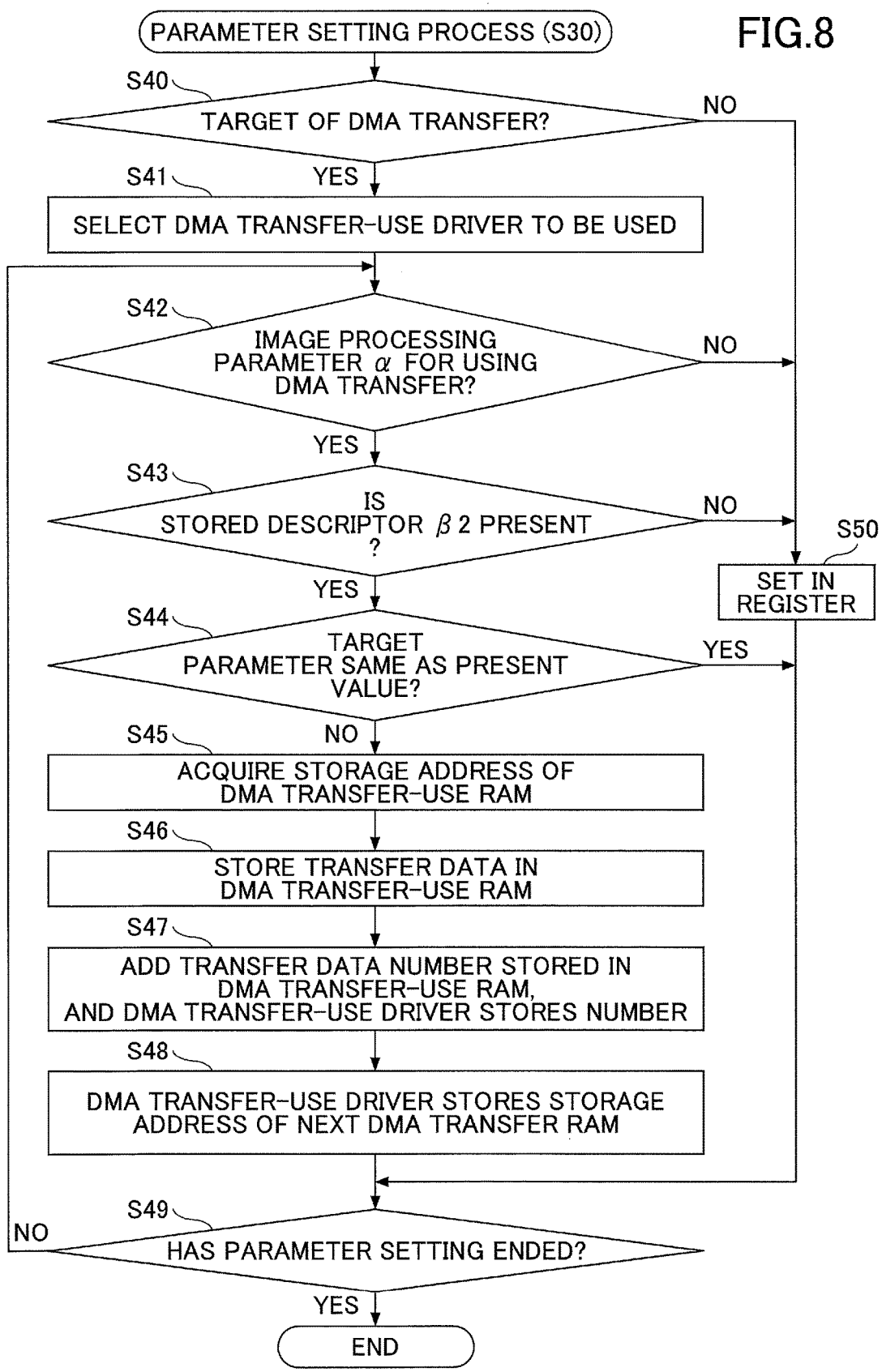
FIG. 8 is a flowchart of a parameter setting process.

Furthermore, when a DMA transfer error occurs and the DMA transfer is cancelled, the image processing control unit 111 executes the process of the flowchart of FIG. 6 again with respect to the same image processing parameter α, and in step S30, the image processing control unit 111 sets the same image processing parameter α in the register 133a by the image processing control unit 111 itself (NO in step S40, step S50 in FIG. 8). That is, when a DMA transfer error occurs and the DMA transfer is cancelled, the image processing control unit 111 removes the image processing parameter α from the target of DMA transfer, and sets the image processing parameter α in the register 133a by itself.

When the DMA transfer is successfully ended (NO in step S37), the module 133 shifts to the process of step S38.

In step S38, the PDMAC 132 performs image processing on the image data based on the image processing parameter α set in the register 133a.

(Relationship Between Descriptor Management Information β1 and Descriptor β2)

In the parameter setting process of step S30, when the image processing parameter α is set by using DMA transfer, the DMA transfer-use driver 111a stores the transfer data in the DMA transfer-use RAM 136, and also generates the descriptor β2 and stores the descriptor β2 in the DMA transfer-use RAM 136. In the following, a description is given of the process of generating the descriptor β2.

When the DMA transfer-use driver 111a stores the transfer data in the DMA transfer-use RAM 136, the DMA transfer-use driver 111a holds information relevant to the transfer data, such as the leading address of the transfer data in the DMA transfer-use RAM 136, the transfer data number (number of transfer data items), etc. In the following, the information relevant to the transfer data is referred to as descriptor management information β1.

The DMA transfer-use driver 111a extracts part of the information in the descriptor management information β1, and stores the extracted information in the DMA transfer-use RAM 136 as the descriptor β2. When performing DMA transfer, the DMA transfer-use driver 111a specifies the path of image processing and the leading address of the descriptor β2 in the DMA transfer-use RAM 136, and activates the PDMAC 132.

In the following, with reference to FIG. 7, a more detailed description is given of the process of generating the descriptor β2 in step S33 of FIG. 6, and the process of activating the PDMAC 132 in step S34 of FIG. 6.

FIG. 7 is for describing the process of generating the descriptor β2 and the process of activating the PDMAC 132. Each DMA transfer-use driver 111a holds one or more descriptor management information items β1.

For example, the DMA transfer-use driver A holds the descriptor management information β1 (1), the descriptor management information β1 (2), and the descriptor management information β1 (3). The descriptor management information β1 (1) includes the address of descriptor β2 (1) in the DMA transfer-use RAM 136, the register information for the descriptor β2 (1), the leading address of the transfer data 1 in the DMA transfer-use RAM 136, the end address of transfer data 1 in the DMA transfer-use RAM 136, the transfer data number, and the address of the descriptor β2 (2) in the DMA transfer-use RAM 136. The register information for descriptor β2 (1) is address information of the register 133a in which the transfer data is to be set.

Note that the descriptor management information β1 (2) similarly includes information relevant to the descriptor β2 (2), and the descriptor management information β1 (3) similarly includes information relevant to the descriptor β2 (3).

The DMA transfer-use driver A generates the descriptor β2 (1), when storing the transfer data 1 in the DMA transfer-use RAM 136. The DMA transfer-use driver A extracts the leading address of the transfer data 1 in the DMA transfer-use RAM 136, the transfer data number, and the address of the descriptor β2 (2) in the DMA transfer-use RAM 136, included in the descriptor management information β1. The DMA transfer-use driver A generates the descriptor β2 (1) based on the extracted information. Next, the DMA transfer-use driver A sets the descriptor β2 (1) in the position in the DMA transfer-use RAM 136 indicated by the "address of the descriptor β2 (1)" in the descriptor management information β1 (1).

Furthermore, when performing image processing by using DMA transfer, the DMA transfer-use driver A sets, in the PDMAC 132, the image processing path γ for activating the PDMAC 132 and the address of the descriptor β2 (1) in the DMA transfer-use RAM 136. The PDMAC 132 accesses the descriptor β2 (1) based on the address of the descriptor β2 (1) in the DMA transfer-use RAM 136 that has been set.

Note that the transfer data number included in the descriptor management information β1 may increase after the descriptor β2 (1) has been generated, and therefore the DMA transfer-use driver A may update the transfer data number of the descriptor β2 (1) when activating the PDMAC 132. In the following, a description is given of the parameter setting process of step S30 in FIG. 6, with reference to FIG. 8.

(Flow of Parameter Setting Process)

FIG. 8 is a flowchart of the parameter setting process. The image processing control unit 111 determines whether to use DMA transfer when setting the image processing parameter α in the register 133a (step S40). When DMA transfer is not to be used (NO in step S40), the image processing control unit 111 sets the image processing parameter α in the register 133a by itself (step S50), and shifts to the process of step S49. For example, when the power is turned on or when returning from a power-saving state, the image processing control unit 111 may set the image processing parameter α in the register 133a by itself, without using DMA transfer.

On the other hand, when DMA transfer is to be used (YES in step S40), the image processing control unit 111 selects the DMA transfer-use driver 111a to be used (step S41). For example, when color printing is to be performed, the image processing control unit 111 selects DMA transfer-use drivers 111a respectively corresponding to the four colors of yellow, magenta, cyan, and black, and a special color.

Next, the selected DMA transfer-use driver 111a determines whether the image processing parameter α is a target of DMA transfer, when setting the image processing parameter α in the register 133a (step S42). For example, the DMA transfer-use driver 111a may determine whether the image processing parameter α is a target of DMA transfer, based on whether the number of image planes formed by image processing (number of copies to be printed, etc.) is greater than or equal to a predetermined number. Furthermore, the image processing control unit 111 may use Case 4 when the time of the READY state (standby time of image processing) is greater than or equal to a predetermined time. Note that the image processing control unit 111 may obtain the time of the READY state by the printing speed.

In the following, the image processing parameter α that is the target of processing by the DMA transfer-use driver 111a in FIG. 8 is referred to as a "target parameter".

When the target parameter is a target of DMA transfer (YES in step S42), the DMA transfer-use driver 111a shifts to the process of step S43. On the other hand, when the target parameter is not a target of DMA transfer (NO in step S42), the DMA transfer-use driver 111a sets the target parameter in the register 133a by itself (step S50), and shifts to the process of step S49.

In step S43, the DMA transfer-use driver 111a determines whether a descriptor β2 corresponding to the target parameter is present in the DMA transfer-use RAM 136, by referring to the descriptor management information β1. When a descriptor β2 corresponding to the target parameter is present (YES in step S43), the DMA transfer-use driver 111a shifts to the process of step S44. On the other hand, when a descriptor β2 corresponding to the target parameter is not present (NO in step S43), the DMA transfer-use driver 111a sets the target parameter in the register 133a by itself (step S50), and shifts to the process of step S49.

In step S44, the DMA transfer-use driver 111a determines whether the value of the target parameter is the same as the value present in the DMA transfer-use RAM 136.

For example, the DMA transfer-use driver 111a refers to a table including the target parameter, and when the referred table has already been used for DMA transfer, the DMA transfer-use driver 111a determines that the value of the target parameter is the same as the value present in the DMA transfer-use RAM 136. Note that the DMA transfer-use driver 111a may set a flag in the table used for DMA transfer, and may determine whether the table has already been used for DMA transfer according to whether there is a flag.

On the other hand, when the referred table has not been used for DMA transfer, the DMA transfer-use driver 111a determines that the value of the target parameter is different from the value present in the DMA transfer-use RAM 136. Note that the table referred to by the DMA transfer-use driver 111a includes one or more image processing parameters α managed by the image processing control unit 111.

The DMA transfer-use driver 111a omits the setting of the target parameter when the value of the target parameter is the same as the value present in the DMA transfer-use RAM 136 (YES in step S44), and shifts to the process of step S49. On the other hand, when the value of the target parameter is different from the value present in the DMA transfer-use RAM 136 (NO in step S44), the DMA transfer-use driver 111a shifts to the process of step S45.

In step S45, the DMA transfer-use driver 111a acquires the storage address of the transfer data in the DMA transfer-use RAM 136. For example, the DMA transfer-use driver 111a acquires the end address of the transfer data in the DMA transfer-use RAM 136 specified by the descriptor β2. Note that immediately after the power is turned on, the transfer data in the DMA transfer-use RAM 136 is cleared, and therefore the DMA transfer-use driver 111a acquires the leading address of the area for storing the transfer data in the DMA transfer-use RAM 136. Furthermore, the DMA transfer-use driver 111a also similarly acquires the leading address of the area for storing the transfer data in the DMA transfer-use RAM 136, when overwriting the transfer data in the DMA transfer-use RAM 136.

Next, the DMA transfer-use driver 111a stores the transfer data in the acquired address of the DMA transfer-use RAM 136 (step S46).

The DMA transfer-use driver 111a adds the stored number of transfer data items (transfer data number) to the transfer data number included in the descriptor management information β1, and updates the transfer data number in the descriptor management information β1 (step S47). Note that the DMA transfer-use driver 111a adds the transfer data number after setting the transfer data number as zero, when storing the transfer data immediately after turning on the power or when overwriting the transfer data in the DMA transfer-use RAM 136.

The DMA transfer-use driver 111a acquires the end address of the transfer data stored in the DMA transfer-use RAM 136, as the storage address of the next DMA transfer, and stores the address in the descriptor management information β1 in the DMA transfer-use driver 111a (step S48).

The DMA transfer-use driver 111a determines whether the parameter setting process has ended (step S49), and when the parameter setting process has ended (YES in step S49), the DMA transfer-use driver 111a ends the process. Furthermore, when the parameter setting process has not ended (NO in step S49), the DMA transfer-use driver 111a repeats the process of step S42.

A specific example of an application of the above process is described.

FIG. 9 illustrates a specific example of a method of setting an image processing parameter α. With reference to FIGS. 10A through 13, a description is given of methods of setting an image processing parameter, for the respective four methods of setting an image processing parameter (Case 1, Case 2, Case 3, Case 4) illustrated in FIG. 9.

In FIG. 9, there are four types of image processing parameters α, Type-1, Type-2, Type-3, and Type-4. In Type-1, the image processing parameter for the first side (front side) and the image processing parameter for the second side (back side) are different (feature 1). Furthermore, in Type-1, the image processing parameters are stored in a ROM (Read Only Memory), and therefore there is no need to calculate the image processing parameters (feature 2). In Type-2, the image processing parameter for the first side (front side) and the image processing parameter for the second side (back side) are different (feature 1). Furthermore, in Type-2, the image processing parameters are corrected due to machine difference or changes with time, or a condition is specified by a user, and therefore the image processing parameters are obtained by calculation (feature 2). Note that machine difference is, for example, the difference in the density of the color, etc., output from the plotters 170 of the respective image processing systems 10. In Type-3, the image processing parameter for the first side (front side) and the image processing parameter for the second side (back side) are the same (feature 1). Furthermore, in Type-3, the image processing parameters are stored in a ROM (Read Only Memory), and therefore there is no need to calculate the image processing parameters (feature 2). In Type-4, the image processing parameter for the first side (front side) and the image processing parameter for the second side (back side) are the same (feature 1). Furthermore, in Type-4, the image processing parameters are corrected due to machine difference or changes with time, or a condition is specified by a user, and therefore the image processing parameters are obtained by calculation (feature 2).

As the methods of setting the image processing parameter, there are Case 1, Case 2, Case 3, and Case 4. In Case 1, the image processing unit 100 uses DMA transfer to set the image processing parameters of all of Type-1 through Type-4, in the register 133*a* in the module 133. In Case 2, the image processing unit 100 uses DMA transfer to set the image processing parameters of Type-1 and Type-2 in the register 133*a* in the module 133, and uses the CPU 110 to directly set the image processing parameters of Type-3 and Type-4 in the register 133*a*. In Case 3, the image processing unit 100 uses DMA transfer to set the image processing parameters of Type-1 in the register 133*a* in the module 133, and uses the CPU 110 to directly set the image processing parameters of Type-2, Type-3, and Type-4 in the register 133*a*. In Case 4, the image processing unit 100 uses the CPU 110 to directly set the image processing parameters of all of Type-1 through Type-4 in the register 133*a*.

The memory usage amount increases in the order of Case 4, Case 3, Case 2, and Case 1, and therefore the image processing control unit 111 may select the method of setting the image processing parameters according to the usable memory amount in the DMA transfer-use RAM 136.

Furthermore, the image processing control unit 111 may use Case 4, when the time of the READY state (standby time of image processing) is greater than or equal to a predetermined time. Note that the image processing control unit 111 may obtain the time of the READY state by the printing speed.

Figure 10B:
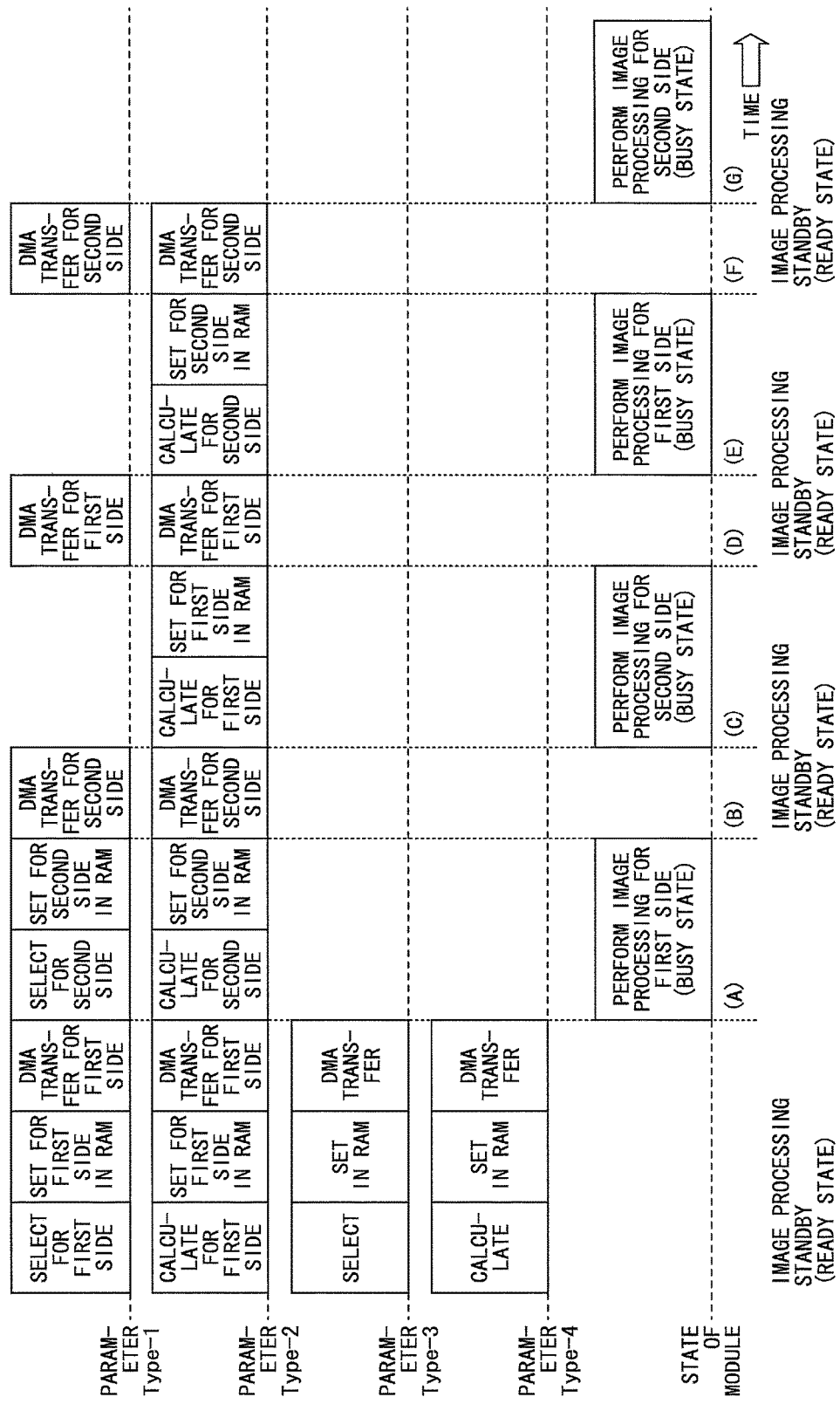

FIGS. 10A and 10B are for describing the method of setting image processing parameters of Case 1. Case 1 (Part 1) of FIG. 10A indicates a case where the image processing parameters of Type-1 and Type-2 can be used in the next image processing. Furthermore, Case 1 (Part 2) of FIG. 10B indicates a case where the image processing parameters of Type-1 can be used in the next image processing, and the image processing parameters of Type-2 that have been set in the DMA transfer-use RAM 136 cannot be used in the next image processing. Note that the same conditions apply to Case 2 (Part 1) of FIG. 11A and Case 2 (Part 2) of FIG. 11B.

The horizontal axis indicates the time. Furthermore, processes performed at the image processing unit 100 are indicated in the order of the image processing parameters of Type-1, Type-2, Type-3, and Type-4, from the top stage. Furthermore, at the bottommost stage, the state of the module 133 is indicated. A state of the module 133 where image processing is being performed on the image data and an image processing parameter α cannot be set in the register 133*a* is referred to as a "BUSY state", and a state of the module 133 of image processing standby and an image processing parameter α can be set in the register 133*a* is referred to as a "READY state".

In Case 1 (Part 1), the image processing parameters of Type-1, Type-2, Type-3, and Type-4 are set by the following procedures.

The setting of the image processing parameter of Type-1 is performed by the following procedures. The image processing unit 100 selects and acquires the image processing parameter for the first side, sets the image processing parameter for the first side in the DMA transfer-use RAM 136, and transfers the image processing parameter for the first side by DMA transfer. Next, the image processing unit 100 selects and acquires the image processing parameter for the second side, sets the image processing parameter for the second side in the DMA transfer-use RAM 136, and transfers the image processing parameter for the second side by DMA transfer.

The setting of the image processing parameter of Type-2 is performed by the following procedures. The image processing unit 100 calculates and acquires the image processing parameter for the first side, sets the image processing parameter for the first side in the DMA transfer-use RAM 136, and transfers the image processing parameter for the first side by DMA transfer. Next, the image processing unit 100 calculates and acquires the image processing parameter for the second side, sets the image processing parameter for the second side in the DMA transfer-use RAM 136, and transfers the image processing parameter for the second side by DMA transfer.

The setting of the image processing parameter of Type-3 is performed by the following procedures. The image processing unit 100 selects and acquires the image processing parameter, sets the image processing parameter in the DMA transfer-use RAM 136, and transfers the image processing parameter by DMA transfer.

The setting of the image processing parameter of Type-4 is performed by the following procedures. The image processing unit 100 calculates and acquires the image processing parameter, sets the image processing parameter in the DMA transfer-use RAM 136, and transfers the image processing parameter by DMA transfer.

Furthermore, in Case 1 (Part 2), the setting of the image processing parameter of Type-2 is performed by the following procedures. The image processing unit 100 calculates and acquires the image processing parameter for the first side, sets the image processing parameter for the first side in the DMA transfer-use RAM 136, and transfers the image processing parameter for the first side by DMA transfer. Next, the image processing unit 100 calculates and acquires the image processing parameter for the second side, sets the image processing parameter for the second side in the DMA transfer-use RAM 136, and transfers the image processing parameter for the second side by DMA transfer. Note that in Case 1 (Part 2), the image processing parameter of Type-2 cannot be used for the next image processing, and therefore the image processing unit 100 repeats the process of calculating an image processing parameter and setting the image processing parameter in the DMA transfer-use RAM 136, every time image processing is performed.

Next, a description is given of the state of the module 133 in Case 1 (Part 1). The image processing device 130 is in a READY state until an image processing parameter is transferred. The image processing unit 100 transfers the image processing parameter for the first side of Type-1 and Type-2 by DMA transfer. After DMA transfer ends, the image processing unit 100 starts image processing on the first side, and the state of the module 133 becomes a BUSY state (A). After the image processing on the first side is ended, the state of the module 133 becomes a READY state (B), and the image processing unit 100 transfers the image processing parameter for the second side of Type-1 and Type-2 by DMA transfer. After DMA transfer ends, the image processing unit 100 starts image processing on the second side, and the state of the module 133 becomes a BUSY state (C). After the image processing on the second side is ended, the state of the module 133 becomes a READY state (D), and the image processing unit 100 transfers the image processing parameter for the first side of Type-1 and Type-2 already set in the DMA transfer-use RAM 136, by DMA transfer. After DMA transfer ends, the image processing unit 100 starts image processing on the first side, and the state of the module 133 becomes a BUSY state (E). After the image processing on the first side is ended, the state of the module 133 becomes a READY state (F), and the image processing unit 100 transfers the image processing parameter for the second side of Type-1 and Type-2 already set in the DMA transfer-use RAM 136, by DMA transfer. After DMA transfer ends, the image processing unit 100 starts image processing on the second side, and the state of the module 133 becomes a BUSY state (G).

Next, a description is given of the state of the module 133 in Case 1 (Part 2). After transferring the image processing parameter for the first side and the second side of Type-2 by DMA transfer, while the module 133 is in a BUSY state (C) due to the image processing on the second side, the image processing unit 100 recalculates and acquires the image processing parameter for the first side, and sets the image processing parameter in the DMA transfer-use RAM 136. After the image processing on the second side is ended, and the state of the module 133 becomes a READY state (D), the image processing unit 100 transfers the recalculated image processing parameter for the first side by DMA transfer. Next, while the module 133 is in a BUSY state (E) due to the image processing on the first side, the image processing unit 100 recalculates and acquires the image processing parameter for the second side, and sets the image processing parameter in the DMA transfer-use RAM 136. After the image processing on the first side is ended, and the state of the module 133 becomes a READY state (F), the image processing unit 100 transfers the recalculated image processing parameter for the second side by DMA transfer.

Figure 11B:
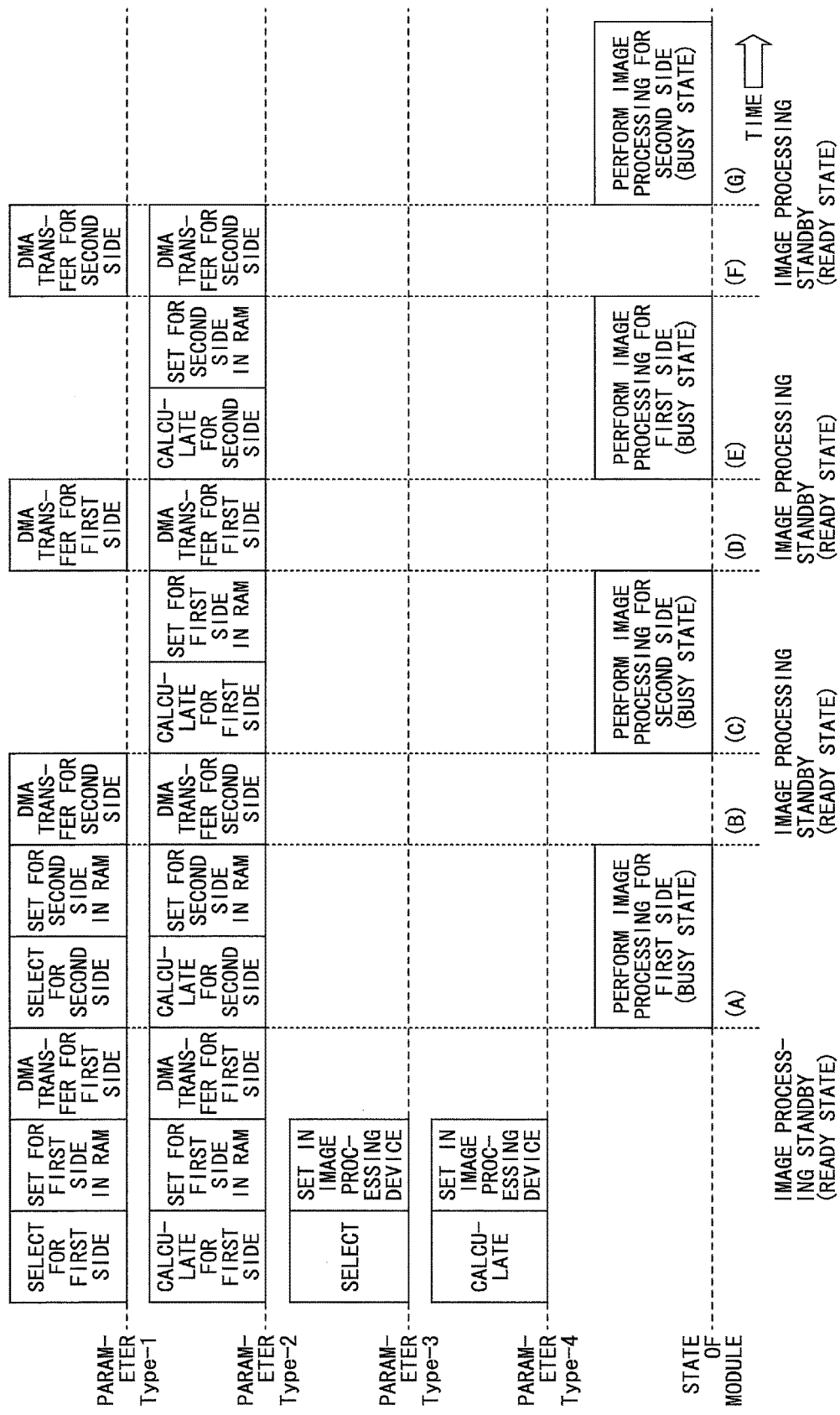

FIGS. 11A and 11B are for describing the method of setting image processing parameters of Case 2. In Case 2 (Part 1) of FIG. 11A, the method of setting image processing parameters of Type-1 and Type-2, is the same as that of Case 1 (Part 1). Furthermore, in Case 2 (Part 2) of FIG. 11B, the method of setting image processing parameters of Type-1 and Type-2, is the same as that of Case 1 (Part 2).

The setting of the image processing parameter of Type-3 is performed by the following procedures. The image processing unit 100 selects and acquires the image processing parameter, and the CPU 110 directly sets the image processing parameter in the register 133*a*.

The setting of the image processing parameter of Type-4 is performed by the following procedures. The image processing unit 100 calculates and acquires the image processing parameter, and the CPU 110 directly sets the image processing parameter in the register 133*a*.

FIG. 12 is for describing the method of setting image processing parameters of Case 3. In Case 3, the method of setting image processing parameters of Type-1, is the same as that of Case 1 (Part 1). Furthermore, in Case 3, the method of setting image processing parameters of Type-3 and Type-4, is the same as that of Case 2 (Part 1).

The setting of the image processing parameters of Type-2 is performed by the following procedures. The image processing unit 100 calculates and acquires the image processing parameter for the first side, and the CPU 110 directly sets the image processing parameter for the first side in the register 133*a*. Next, when image processing on the first side is started (A), the image processing unit 100 calculates and acquires the image processing parameter for the second side. When the image processing unit 100 ends image processing on the first side (B), the CPU 110 directly sets the image processing parameter for the second side in the register 133*a*. Next, when image processing on the second side is started (C), the image processing unit 100 calculates and acquires the image processing parameter for the first side. When the image processing unit 100 ends image processing on the second side (D), the CPU 110 directly sets the image processing parameter for the first side in the register 133*a*. The image processing unit 100 repeatedly executes the above processes. Note that the CPU 110 performs the process of directly setting the image processing parameter in the register 133*a*, when the state of the module 133 has become a READY state.

FIG. 13 is for describing the method of setting image processing parameters of Case 4. In Case 4, the method of setting image processing parameters of Type-3 and Type-4, is the same as that of Case 2 (Part 1).

The setting of the image processing parameters of Type-1 and Type-2 is performed by the following procedures. The image processing unit 100 selects and acquires the image processing parameter for the first side, and the CPU 110 directly sets the image processing parameter for the first side in the register 133*a*. Next, when image processing on the first side is started (A), the image processing unit 100 selects and acquires the image processing parameter for the second side. When the image processing unit 100 ends image processing on the first side (B), the CPU 110 directly sets the image processing parameter for the second side in the register 133*a*. Next, when image processing on the second side is started (C), the image processing unit 100 selects and acquires the image processing parameter for the first side. When the image processing unit 100 ends image processing on the second side (D), the CPU 110 directly sets the image processing parameter for the first side in the register 133*a*. The image processing unit 100 repeatedly executes the above processes.

FIG. 14 is for describing the method of setting image processing parameters in a case of performing color determination of an original document. The image processing unit 100 stores image processing parameters for color original document processing and image processing parameters for monochrome original document processing of Type-1 and Type-2 in the DMA transfer-use RAM 136. The image processing unit 100 performs color determination of an original document read by the scanner 160, and when the image processing unit 100 determines that the original document is a color original document (A), the image processing unit 100 transfers the image processing parameters for color original document processing of Type-1 and Type-2, by DMA transfer. The image processing device 130 performs image processing of a color original document (B).

Next, the image processing unit 100 performs color determination of an original document read by the scanner 160, and when the image processing unit 100 determines that the original document is a monochrome original document (C), the image processing unit 100 transfers the image processing parameters for monochrome original document processing of Type-1 and Type-2, by DMA transfer. The image processing device 130 performs image processing of a monochrome original document (D).

Note that the image processing unit 100 may store the image processing parameters for color original document processing and for monochrome original document processing for a first side and the image processing parameters for color original document processing and for monochrome original document processing for a second side in the DMA transfer-use RAM 136, and may transfer the image processing parameters according to need by DMA transfer when performing image processing on the first side and the second side.

Note that in the present embodiment, the image processing device 130 is an example of an image processing unit. The image processing control unit 111 is an example of a control unit. The PDMAC 132 is an example of a transfer unit. The DMA transfer-use RAM 136 is an example of a first storage unit. The register 133a is an example of a second storage unit. The descriptor is an example of identification information.

According to one embodiment of the present invention, an image forming apparatus and an image forming method are provided, which are capable of appropriately reducing the processing load of the CPU according to the image processing.

The image forming apparatus and the image forming method are not limited to the specific embodiments described herein, and variations and modifications may be made without departing from the spirit and scope of the present invention.

The present application is based on and claims the benefit of priority of Japanese Priority Patent Application No. 2015-120604, filed on Jun. 15, 2015, the entire contents of which are hereby incorporated herein by reference.

What is claimed is:

1. An image processing system that transfers a parameter by a first transfer mode that uses direct memory access transfer or by a second transfer mode that does not use direct memory access transfer, according to image processing using the parameter, the image processing system comprising:
   a control unit configured to select, according to the image processing using the parameter, between using the first transfer mode or the second transfer mode to transfer the parameter, and store the parameter at a storage position of a first storage unit upon a selection by the control unit to use the first transfer mode;
   a descriptor that indicates the storage position of the first storage unit, the descriptor generated by the control unit and stored by the control unit in the first storage unit upon the selection by the control unit to use the first transfer mode;
   a parameter direct memory access controller configured to acquire the parameter from the first storage unit based on the descriptor stored in the first storage unit, and transfer the parameter to the second storage unit;
   wherein the control unit is configured to store the parameter in the second storage unit, upon a selection by the control unit to use the second transfer mode; and
   an image processing unit configured to execute requested image processing, using the parameter transferred to the second storage unit by the parameter direct memory access controller upon the selection by the control unit to use the first transfer mode, and configured to execute requested image processing, using the parameter stored in the second storage unit by the control unit upon the selection by the control unit to use the second transfer mode.

2. The image processing system according to claim 1, wherein the control unit stores the parameter in the second storage unit, when a standby time of the image processing using the parameter is greater than or equal to a predetermined time.

3. The image processing system according to claim 1, wherein the control unit stores the parameter in the second storage unit, when a number of planes of an image formed by the image processing using the parameter, is less than a predetermined number.

4. The image processing system according to claim 1, wherein
   the control unit stores a parameter for color for a first side of a document, a parameter for monochrome for the first side, a parameter for color for a second side of the document, and a parameter for monochrome for the second side in the first storage unit, and
   the parameter direct memory access controller transfers at least one of the parameter for color for the first side and the parameter for monochrome for the first side to the second storage unit when image processing of the first side is requested, and the parameter direct memory access controller transfers at least one of the parameter for color for the second side and the parameter for monochrome for the second side to the second storage unit when image processing of the second side is requested.

5. The image processing system according to claim 2, wherein
   the control unit stores a parameter for color for a first side of a document, a parameter for monochrome for the first side, a parameter for color for a second side of the document, and a parameter for monochrome for the second side in the first storage unit, and
   the parameter direct memory access controller transfers at least one of the parameter for color for the first side and the parameter for monochrome for the first side to the second storage unit when image processing of the first side is requested, and the parameter direct memory access controller transfers at least one of the parameter for color for the second side and the parameter for monochrome for the second side to the second storage unit when image processing of the second side is requested.

6. The image processing system according to claim 3, wherein
   the control unit stores a parameter for color for a first side of a document, a parameter for monochrome for the first side, a parameter for color for a second side of the document, and a parameter for monochrome for the second side in the first storage unit, and
   the parameter direct memory access controller transfers at least one of the parameter for color for the first side and the parameter for monochrome for the first side to the second storage unit when image processing of the first side is requested, and the parameter direct memory access controller transfers at least one of the parameter for color for the second side and the parameter for monochrome for the second side to the second storage unit when image processing of the second side is requested.

7. The image processing system according to claim 1, wherein the control unit stores the parameter in the second storage unit, when the transfer of the parameter by the parameter direct memory access controller is unsuccessful.

8. The image processing system according to claim 2, wherein the control unit stores the parameter in the second storage unit, when the transfer of the parameter by the parameter direct memory access controller is unsuccessful.

9. The image processing system according to claim 3, wherein the control unit stores the parameter in the second storage unit, when the transfer of the parameter by the parameter direct memory access controller is unsuccessful.

10. The image processing system according to claim 4, wherein the control unit stores the parameter in the second storage unit, when the transfer of the parameter by the parameter direct memory access controller is unsuccessful.

11. An image processing method executed by an image processing system that transfers a parameter by a first transfer mode that uses direct memory access transfer or by a second transfer mode that does not use direct memory access transfer, according to image processing using the parameter, the image forming method comprising:
- selecting, by a control unit, according to the image processing using the parameter, between using the first transfer mode or the second transfer mode to transfer the parameter, and
- storing, by the control unit, the parameter at a storage position of a first storage unit upon a selection by the control unit to use the first transfer mode;
- generating, by the control unit, a descriptor that indicates the storage position of the first storage unit,
- storing, by the control unit, the generated descriptor in the first storage unit upon the selection by the control unit to use the first transfer mode;
- acquiring, by a parameter direct memory access controller, the parameter from the first storage unit based on the descriptor stored in the first storage unit;
- transferring, by the parameter direct memory access controller, the acquired parameter to the second storage unit;
- storing, by the control unit, the parameter in the second storage unit, upon a selection by the control unit to use the second transfer mode;
- executing, by an image processing unit, requested image processing, using the parameter transferred to the second storage unit by the parameter direct memory access controller upon the selection by the control unit to use the first transfer mode; and
- executing, by the image processing unit, requested image processing, using the parameter stored in the second storage unit by the control unit upon the selection by the control unit to use the second transfer mode.

12. A non-transitory computer-readable recording medium storing a program that causes a computer to execute a process for performing the image processing method according to claim 11.

13. The image processing system according to claim 1, wherein the parameter is an image processing parameter.

* * * * *